United States Patent [19]

Shima et al.

[11] Patent Number: 5,835,922
[45] Date of Patent: Nov. 10, 1998

[54] DOCUMENT PROCESSING APPARATUS AND METHOD FOR INPUTTING THE REQUIREMENTS OF A READER OR WRITER AND FOR PROCESSING DOCUMENTS ACCORDING TO THE REQUIREMENTS

[75] Inventors: Yoshihiro Shima, Tokorozawa; Katsumi Marukawa, Kodaira; Masashi Koga; Kazuki Nakashima, both of Kokubunji; Tetsuzo Uehara, Tokyo, all of Japan

[73] Assignee: Hitachi, Ltd., Tokyo, Japan

[21] Appl. No.: 939,333

[22] Filed: Sep. 29, 1997

Related U.S. Application Data

[63] Continuation of Ser. No. 127,573, Sep. 28, 1993, abandoned.

[30] Foreign Application Priority Data

Sep. 30, 1992 [JP] Japan .................................. 4-261105
May 14, 1993 [JP] Japan .................................. 5-112741

[51] Int. Cl.$^6$ ........................................................ G06F 17/30
[52] U.S. Cl. ............................................. 707/522; 707/526
[58] Field of Search ................................. 707/522, 517, 707/526, 528, 500

[56] References Cited

U.S. PATENT DOCUMENTS

| 5,005,127 | 4/1991 | Kugimiya et al. | 364/419.05 |
| 5,200,893 | 4/1993 | Ozawa et al. | 395/144 |
| 5,325,298 | 6/1994 | Gallant | 364/419.19 |

FOREIGN PATENT DOCUMENTS

| 2-288960 | 11/1990 | Japan . |
| 3-63758 | 3/1991 | Japan . |
| 3-226860 | 10/1991 | Japan . |
| 3-244077 | 10/1991 | Japan . |
| 4-31966 | 2/1992 | Japan . |
| 4-74259 | 3/1992 | Japan . |

OTHER PUBLICATIONS

Rooney, "FrameMaker slated to make its debut in Windows arena", PC Week, v. 9. n. 3, p. 4, Jan. 1992.

Okada et al., "Story Generation based on dynamics of the mind", Computational Intelligence, v. 8, n. 1, pp. 123–160, Jan. 1992.

Using FrameMaker, FrameMaker 4 Windows and Macintosh Version, Frame Technology Corp., pp. 2–37, 26–1 to 26–18, Sep. 1993.

Taft, FrameMaker 4 update targets 'demanding' users, Computer Reseller News, n. 544, p. 6, Sep. 13, 1993.

Wasson, "FrameMaker 3.0", MacUser, v. 8, n. 2, p. 103, Feb. 1992.

(List continued on next page.)

*Primary Examiner*—Joseph R. Burwell
*Attorney, Agent, or Firm*—Fay, Sharpe, Beall, Fagan, Minnich & McKee

[57] ABSTRACT

In an apparatus for and a method of processing document information, according to a requirement of a writer of document information, the document information is generated, referenced, and re-constructed. Further, according to a requirement of a reader of the document information, the information is referenced and re-constructed. The apparatus includes a reader terminal including means for inputting a requirement of a reader of document information and means for outputting document information referenced and re-constructed according to the requirement, and a writer terminal for inputting therefrom a requirement of a writer of document information and creating document information. The apparatus further includes a document processing unit connected to the reader terminal and the writer terminal. The unit includes means for storing therein the document information produced by the writer terminal and processing means for referencing and re-constructing the stored document information according to the requirement of the user inputted from the reader terminal, thereby outputting therefrom the resultant document information.

9 Claims, 32 Drawing Sheets

OTHER PUBLICATIONS

Pepper, "FrameMaker 3.0 for Windows: sneak preview", *PC Sources*, v. 3, n. 6, p. 507, Jun. 1992.

Rooney, "FrameMaker slated to make its debut in Windows arena", *PC Week*, v. 9, n. 3, p. 4, Jan. 20, 1992.

*Using FrameMaker*, FrameMaker 4 Windows and Macintosh Version, Frame Technology Corp., Sep. 1993, pp. 2–37, 26–1 to 26–18.

Okada et al., "Story generation based on dynamics of the mind", *Computational Intelligence*, v. 8, n. 1, pp. 123–160, 1992.

ISO 8879, Practical SGML 1986.

Hyper Card User's Guide, Apple Computer, Inc. 1990.

The Institute of Electronics, Information and Communication Engineers, Report NLC 91–60 of the IEICE of Japan, pp. 9–16.

Tsuda, K. et al "An Efficient String Exchange Algorithm for Text Reduction", Study report vol. 91, n. 80 (NL–85) (1991) pp. 33–40, Information.

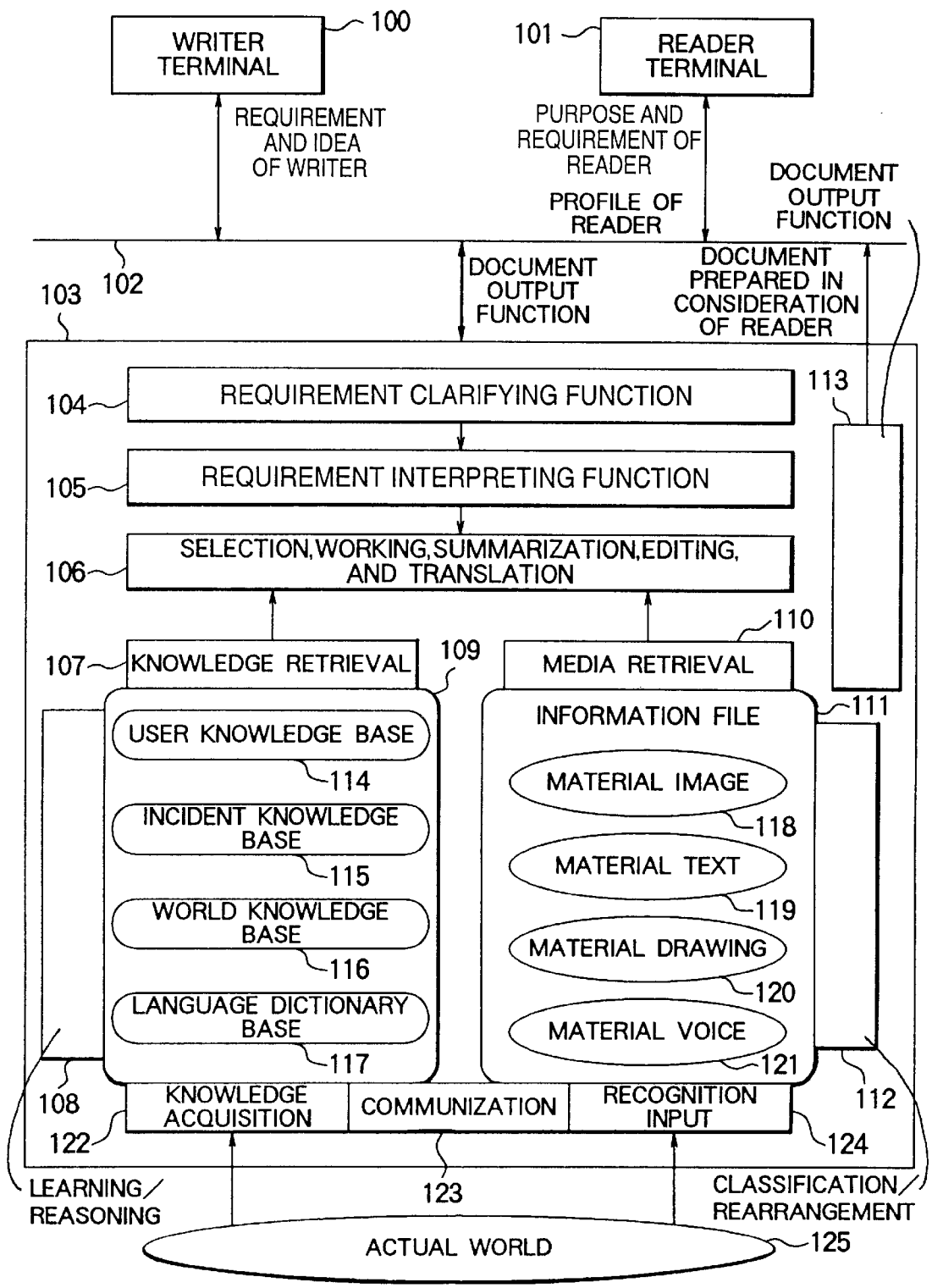

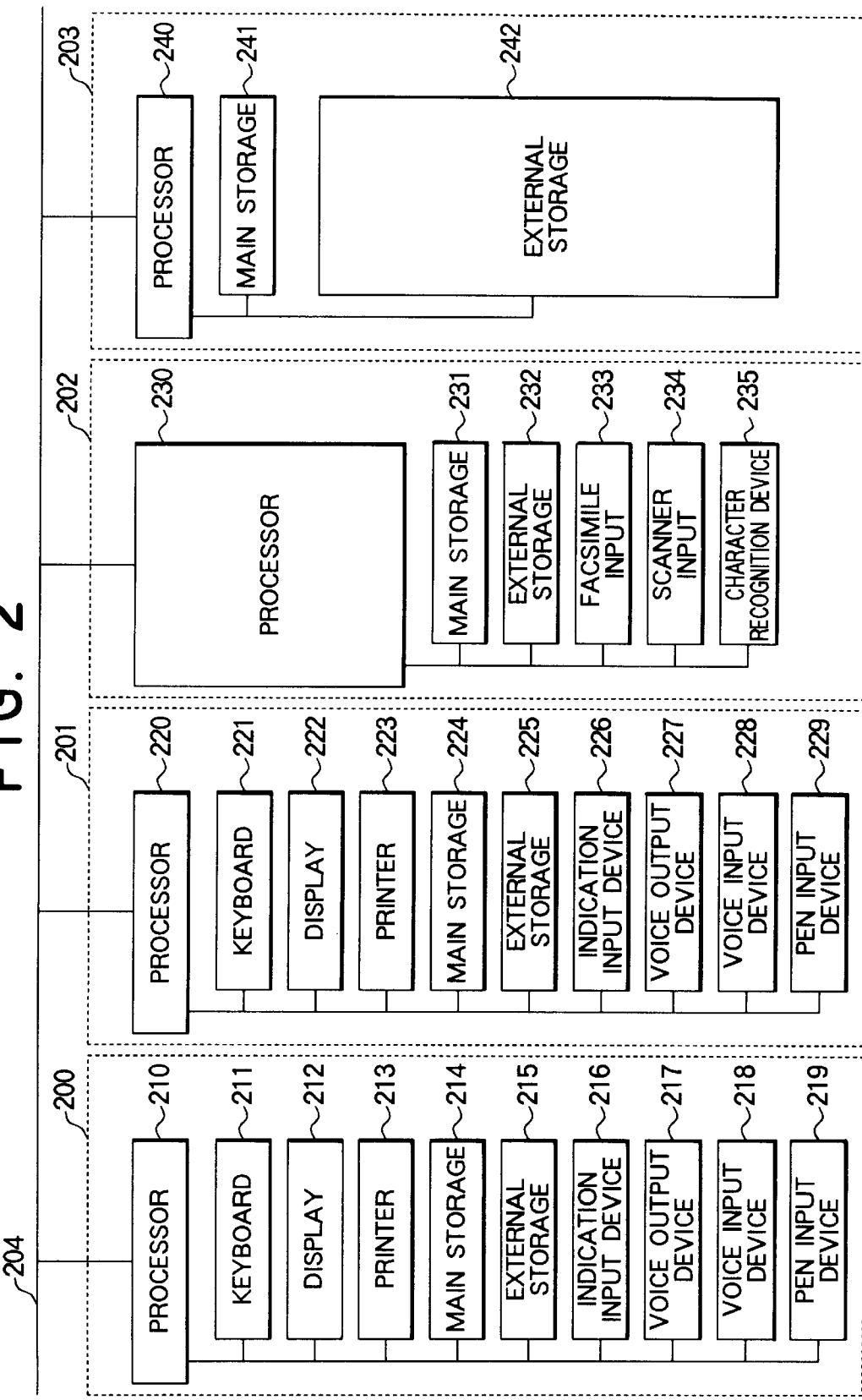

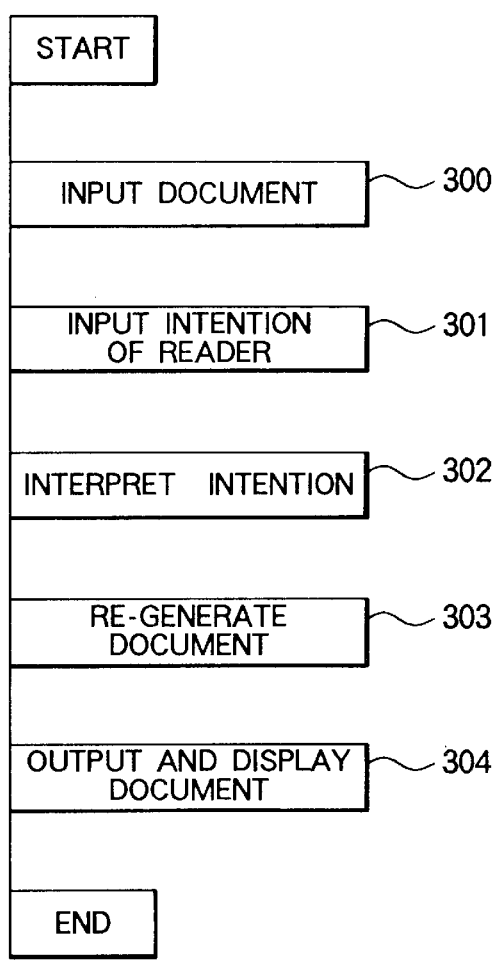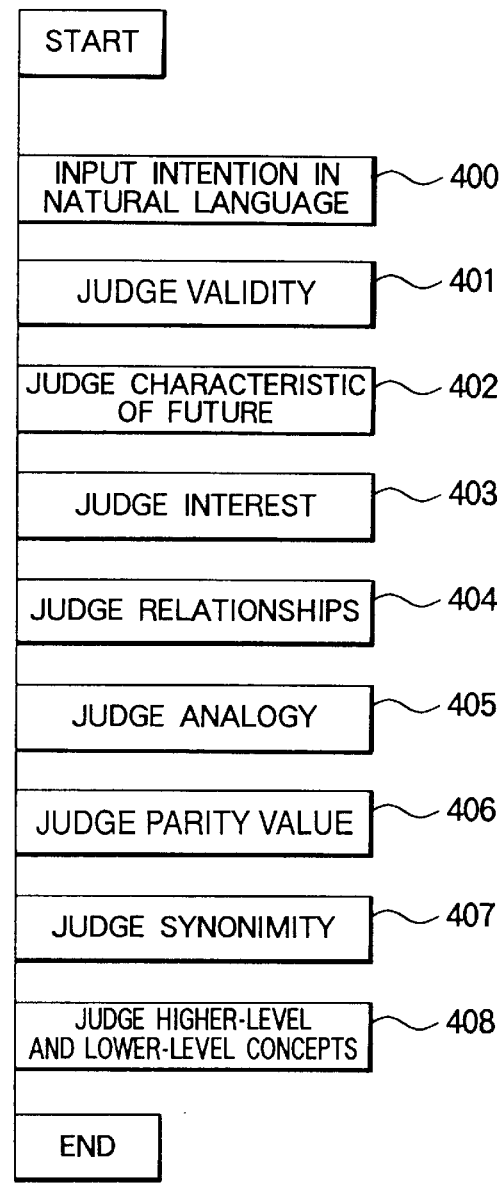

FIG. 13

| | | |
|---|---|---|
| 1301 | OFFICIAL TITLE | DIVISION MANAGER | 1305 |
| 1302 | AGE | 58 | 1306 |
| 1303 | LANGUAGE USED | JAPANESE | 1307 |
| 1304 | OUTPUT DEVICE | DISPLAY 1 | 1308 |

| | | |
|---|---|---|
| 1301 | OFFICIAL TITLE | SCHOOL-BOY | 1305 |
| 1302 | AGE | 10 | 1306 |
| 1303 | LANGUAGE USED | ENGLISH | 1307 |
| 1304 | OUTPUT DEVICE | DISPLAY 2 | 1308 |

| | | |
|---|---|---|
| 1501 — RESOLUTION | 50dpi | — 1504 |
| 1502 — No. OF COLORS | 256 | — 1505 |
| 1503 — DISPLAY SIZE | 1280*1024 | — 1506 |

| | | |
|---|---|---|
| 1601 — RESOLUTION | 400dpi | — 1604 |
| 1602 — No. OF COLORS | 3 | — 1605 |
| 1603 — SIZE | A3 | — 1606 |

| OFFICIAL TITLE | AMOUNT OF OUTPUT DOCUMENT (SHEET) |
|---|---|
| OFFICE MANAGER | 0.2 |
| DIVISION MANAGER | 0.5 |
| SECTION MANAGER | 1.0 |
| GROUP LEADER | 2.0 |
| MEMBERS | 5.0 |

*1.2 : LINK TO CONSTITUENT UNIT 2.1 OF OTHER DOCUMENT
D2.1 : LINK TO CONSTITUENT UNIT 1.2 IN DOCUMENT

FIG. 24A

PERSONAL CHARACTERISTIC INFORMATION 2410

| | | |
|---|---|---|
| 2411 | DATE OF BIRTH | MAY 3, 1982 |
| 2412 | SEX | MALE |
| 2413 | ADDRESS | TOKYO PREFECTURE |
| 2414 | OCCUPATION | 4TH GRADE OF ELEMENTARY SCHOOL |
| 2415 | HOBBY | BASEBALL, SOCCER |
| 2416 | GROUP | GROUP A, GROUP J |

FIG. 24B

PERSONAL STATE INFORMATION 2420

| | | |
|---|---|---|
| 2421 | EXPERIENCE | EXPERIENCE IN THIS SYSTEM |
| 2422 | DOCUMENT HISTORY | LIST OF REFERENCED HYPER-DOCUMENTS |
| 2423 | STATE OF REFERENCE | STATE OF REFERENCE OF THIS DOCUMENT |

FIG. 25A

2510 — GROUP CHARACTERISTIC INFORMATION

| | | |
|---|---|---|
| 2511 | DATE OF BIRTH | APRIL 1982 - MARCH 1983 |
| 2512 | SEX | MALE AND FEMALE |
| 2513 | ADDRESS | SHINJYUKU-WARD, TOKYO |
| 2514 | CLASS | CLASS 1, 3RD GRADE OF ×× SENIOR HIGH SCHOOL |
| 2515 | CHARACTERISTIC OF CLASS | COLLEGE-PREPARATORY COURSE FOR SCIENCE AND TECHNOLOGY |
| 2516 | GROUP | GRADE 3 OF ×× SENIOR HIGH SCHOOL |

FIG. 25B

2520 — GROUP STATE INFORMATION

| | | |
|---|---|---|
| 2521 | EXPERIENCE | EXPERIENCE IN THIS SYSTEM |
| 2522 | DOCUMENT HISTORY | LIST OF REFERENCED HYPER-DOCUMENTS |
| 2523 | REFERENCE STATE | AVERAGE REFERENCE STATE OF THIS DOCUMENT |

FIG. 26

| | | |
|---|---|---|
| 2651 | DATE OF BIRTH | JANUARY 19, 1993 |
| 2652 | NATION | JAPAN |
| 2653 | ADDRESS | TOKYO PREFECTURE |
| 2654 | VERSION NO. | VERSION 2 |
| 2655 | USAGE STATE | NO. OF USAGES, FREQUENCIES OF USAGES |
| 2656 | USERS | LIST OF USERS, MOST-SIGNIFICANT USER |

DATA OF PROGRESS

2801 — DOCUMENT NAME = DOCUMENT 112 : GENJI MONOGATARI (JAPANESE ; STORY OF GENJI)
2802 — LINK TAG AND CURRENT CONSTRUCTION UNIT= , 3.2.2
2803 — PATH OF PROGRESS = 1, 2, 3, 3.1, 3.2, 3.2.3
2804 — SELECTION CONTENTS ACCORDING TO RESPONSES IN REFERENCE OPERATIONS

| CONSTRUCTION UNIT | SELECTION CONTENTS FOR PREVIOUS RESPONSE | OTHER RESPONSE CONTENTS |
|---|---|---|
| 1 | Y | N |
| 3 | 1-2 | 1-1 |
| 3.4 | 4 | 1,3 |

PERSONAL CHARACTERISTIC INFORMATION

| | | |
|---|---|---|
| 2911 | DATA OF BIRTH | MAY 3, 1982 |
| 2912 | SEX | MALE |
| | . . . | |
| 2901 | REFERRENCE LEVEL | L2 |

FIG. 29B

SECURITY ATTRIBUTE INFORMATION (2900)

| | REFERENCE LEVEL | ACCESSIBILITY |
|---|---|---|
| 2902 | | |
| 2903 | L0 | TO BE FREELY REFERENCED |
| 2904 | L1 | TO BE REFERENCED FROM MARTH 1, 1992 |
| 2905 | OTHERS | NOT TO BE REFERENCED |

DOCUMENT PROCESSING APPARATUS AND METHOD FOR INPUTTING THE REQUIREMENTS OF A READER OR WRITER AND FOR PROCESSING DOCUMENTS ACCORDING TO THE REQUIREMENTS

This is a continuation application of Ser. No. 08/127,573, filed Sep. 28, 1993, now abandoned.

BACKGROUND OF THE INVENTION

The present invention relates generally to a document processing apparatus, and more particularly to a document processing apparatus in which a document can be generated, referenced, and/or reconstructed according to an invention or requirement of a writer of the document and an intention or requirement of a reader thereof.

In the prior art, as described in JP-A-2-288960, in order to reflect the intentions of a document generating person, namely, a writer of a document, there are provided a function to help development of the gist of the document and a function to select sentences each having a fixed form, thereby aiding the document generation and the document elaboration.

Moreover, in an article entitled "Generation of Japanese Language Sentences according to Dynamics of Mind", written by Endo et al (NLC91-60 of the IEICE of Japan, pp. 9–16), there has been described an attempt in a story generating operation to generate sentences according to dynamics or changes of mind of a leading person of a story.

Furthermore, in accordance with JP-A-3-226860, there are automatically generated, in a document generation method, ruled lines in a direction of rows to thereby control a flow of character strings.

In addition, according to JP-A-3-63758, a simplified document specification is designated in a predetermined format so as to generate sentences through reasoning of expressions of sentences.

In JP-A-2-288960, there is provided a support function for a writer of a document to generate a document. However, consideration has not been given to processing for a document beforehand generated. Moreover, although the document is received in the form of a sheet of paper or data ready for electronic processing, it is required for the reader to read the received document in the original form, namely, in the initially generated form. Consequently, it is impossible to read only a portion of the document necessary for the reader, for example, only a conclusion. This leads to a problem that there is necessitated a long period of time for the reader to be finished with the document and to recognize the contents thereof for judgment.

Furthermore, the contents of the received document are arranged in an order in which the writer has written elements of the document. Consequently, the user cannot read the contents of the document in a desired sequence. In addition, there may be a problem that the reader cannot understand the language of the document. For example, in a case where a person who cannot understand Japanese sentences receives a document written in Japanese, the receiver cannot read the document in the original form. As above, according to JP-A-2-288960, consideration has not been given to a function of document processing which matches states or situations and intentions of the understanding level of the reader as well as the position or the like of the reader in an organization. Namely, there exists a constraint that the reader is required to receive a fixed document generated according only to conveniences of the writer, and hence the reader cannot rapidly achieve jobs to be conducted by reading the document. This leads to a problem of low efficiency of the document job.

According to the report of the IEICE of Japan described above, when generating sentences of a story, there is produced a model representing changes of mind of the leading character thereof. However, consideration has not been given to a case where the reader actively reconstructs a document beforehand created. Moreover, in this article describing conventional technology, description has been given of a document generating strategy in a case where the reader is an adult and a case where the reader is a child. This, however, is not a strategy for the writer to produce sentences. Namely, there has not been considered a function to reconstruct a document received from the writer so that the contents thereof match the level, the state or situation, and/or the intentions or requirements of the reader. In addition, only the case where the reader is an adult or a child has been taken into consideration. Consequently, the intention of the reader is fixed, namely, there has not been considered a procedure of how to clarify various intentions respectively of the writers and readers.

Furthermore, according to JP-A-3-226860, ruled lines are drawn while the writer is creating a document. However, processing of a document beforehand generated has not been considered, namely, there is missing an operation to produce a document according to intentions.

Moreover, in accordance with JP-A-3-63758, there is provided a document data base including a document knowledge base, document expression formats, a term data base, and a document expression reasoning section such that a manual, a catalogue, a specification, and the like are created in a simplified format. However, consideration has not been given to intentions respectively of the writer and the reader, for example, an intention to rapidly read only a conclusion, or a desire to generate a document in which important portions are emphasized. Namely, the document reconstruction is not conducted to create a document adapted to the user.

Another conventional technology has been proposed according to the International Standard Organization (ISO) as described in the ISO 8879: Information processing—Text and office systems—Standard Generalized Markup Language (SGML) (ISO, 1986). According to the article (to be abbreviated as SGML herebelow), there has been described a method of representing a logical structure of a document in a hierarchic structure equivalent to a tree structure. In addition, between a plurality of documents, there are represented as document type definitions (DTDs) common structures and attributes which can be assigned to constituent units thereof. For each document, there is specified a type to which the document belongs. The document has a structure and attributes allowed for the document type definitions. Moreover, there are set attribute values to attributes allowed for the document type definitions, thereby representing the document.

Furthermore, there has been known, in regard to such a technology, HyperCard, which is an application program operating in the Macintosh personal computer of Apple Computer Inc. There are supported functions for generating a kind of document. The specifications of HyperCard have been described, for example, in Apple's Manual "HyperCard User's Guide" (Apple Computer Inc., 1989). According thereto, a document is configured as a series of cards in this system such that objects such as a field and a button are disposed in each card. The objects are presented to the user so that in response to an operation of the user such as an input or a selection of an object, a next card to be displayed can be decided. To achieve the function of this type, there are provided a kind of program language and an execution function thereof. There is prepared means which keeps, in association with the cards and objects specified therein, a program written in the language so that a portion of the program is initiated in response to an input specified by the user so as to transfer the contents of the specification thereto.

According to the prior art, i.e., SGML, there have been described a method of representing a logical structure of a document and an idea of expressing a format of each document example according to the definition of a class of the document. However, this does not stipulate any application function using the descriptions of the structures.

Moreover, according to documents of Apple, there are provided a language to designate operations of a document in the form of a series of cards and an execution function including a link function to determine a sequence of the operations. The link function has a high degree of freedom, and hence control can arbitrarily move between cards. On the other hand, however, there may arise a problem that in an operation to reference documents according to links, it is difficult to return control to an original reference location. In each card, there are disposed objects which are called fields, button, etc. and which exceed functions prepared by the conventional programming languages, thereby supporting creation of card series including particular operations considered by a programmer. However, no stipulations have been provided for the hierarchic structure of the documents and for the contents of program operations in the cards. In this regard, this system is a general-purpose programming language system, and the programmer is responsible for the method of configuring documents according to the system. Actually, program functions which can be produced by the programming language are comparable to functions of programs generated by a general programming language, rather than those of documents.

SUMMARY OF THE INVENTION

It is therefore an object of the present invention to provide a system for generating, referencing, and reconstructing a document adapted for intentions or requirements of writers and readers. Another object of the present invention is to reconstruct via a network a document written by a writer so that the document matches intentions or requirements of readers. Still another object of the present invention is to efficiently process a received document and thereby to strategically utilize the document. Yet another object of the present invention is to save re-input operations of documents written on sheets of paper and to automatically configure a data base so as to achieve an instantaneous processing of documents, thereby utilizing the documents for a business strategy.

In order to achieve the above objects, there is disposed means for re-processing a document according to the intentions, level, and attribute states of readers, thereby displaying the resultant document. Of a received document thus generated, desired locations thereof are displayed according to an intention of the reader, for example, in a desired sequence related to locations of the document and the display order. Moreover, an attribute of the reader is recognized so that the form of the document is converted according to the attribute. For example, when the reader is an executive, the document is prepared so as to present a summary. In addition, to output and to display the document according to an apparatus used by the user, the document is reconstructed in accordance with a type and specifications of the apparatus.

As for objects to be processed as intentions of the user according to the present invention, there are handled, for example, a desire of the user to read the document at will, an intention to create a document according to a story imagined by the user, and/or an idea to reconfigure a document to be adapted to an object, a plan, or an expectation. Moreover, the attribute states or situations of the user include the continuously changing attribute states and statuses of the user. The document form is reconstructed, for example, in a situation where the document cannot be fully read because the reader is quite busy or must make a strategic decision in a short period of time.

In a case where a document is sent from a writer terminal via a network to a reader terminal, the intention and the attribute state of the reader are clarified to restructure the generated document according to the intention, thereby preparing the document to be adapted to the reader. Consequently, the received document can be effectively processed and can be strategically utilized. Furthermore, a document image received as a document written on sheets of paper or document image data is converted through character recognition processing into an electronic reconstructible document so as to reconstruct the document to match the intention of the reader. Consequently, the document written on sheets of paper can be communized and can be strategically used.

In addition, another object of the present invention is to provide hyper-document information and a method of processing the information in which the user utilizing the document can select, according to each desired portion of the document, a flexible utilization method capable of determining a document reference method including a decision of a next reference position and a display method of the contents of the document. In this regard, a hyper-document indicates not only a document simply represented by character strings but also a "document" in a broad sense for which graphics, images, moving pictures, voices, etc. can be used as transmission means. The "readers" of the hyper-document include readers who read character texts as well as receivers of the contents of the hyper-document for observing the contents displayed as a moving picture and for listening to the contents transmitted in the form of sounds and/or voices. The readers are called users of the hyper-document in accordance with the present invention.

Still another object of the present invention is to provide hyper-document information and a method of processing the information in which characteristics of the user of the document or those related to a group to which the user belongs can be adopted to determine the document reference method.

Moreover, another object of the present invention is to provide hyper-document information and a method of processing the information in which the document reference method is not decided depending on data beforehand prepared. Namely, the method is determined according to a specification of the document designated by the user at a reference point, thereby determining the document reference method.

Additionally, another object of the present invention is to provide hyper-document information and a method of processing the information in which, where common attribute data exists in a plurality of document constituent units or elements, the common attribute data can be kept or stored so as to be controlled in a centralized manner, thereby deciding the document reference method.

Furthermore, another object of the present invention is to provide hyper-document information and a method of processing the information in which a document reference order is developed according to a link relationship not conforming to the hierarchic structure and in which control can be easily returned to an original link position.

Moreover, another object of the present invention is to provide hyper-document information and a method of processing the information in which, after the user interrupts the document reference operation, the system can be restarted according to the interrupted state.

In addition, another object of the present invention is to provide hyper-document information and a method of processing the information in which there are kept the contents of the document or portions thereof reflecting a progress of reference operations of the user or a progress of responses of the user so as to reference again the contents or portions thereof.

Furthermore, another object of the present invention is to provide hyper-document information and a method of processing the information in which, according to attribute data of a document, data of characteristics of the user, and general status data, there can be achieved a control operation to determine whether or not portions of the document are presented to the user.

In relation to the handling of the hyper-document, there are provided according to the present invention hyper-document information and a method of processing the information in which a document is represented in a hierarchic tree structure including constituent units thereof as nodes of the structure. When the user utilizes the document, a document reference method including a method of determining a next reference position and a method of displaying the contents of the document can be decided according to the contents of attribute data described for the respective constituent units. Moreover, the decision is not fixed for each document unit, namely, the user can select the method according to each portion of the document.

Additionally, there are provided according to the present invention hyper-document information and a method of processing the information in which a document reference method including a method of determining a next reference position and a method of displaying the contents of the document can be decided according to characteristics and/or attribute states or situations of the user by referencing, in addition to attribute data of each constituent unit of the document, characteristics related to the user of the document or a group to which the user belongs, and/or data of much more general states which are kept in the system.

Furthermore, there are provided according to the present invention hyper-document information and a method of processing the information in which a document reference method, including a method of determining a next reference position and a method of displaying the contents of the document, can be decided according to inquiries to the user of the document and responses thereto based on indications of the contents kept in the attribute data of each constituent element of the document.

In addition, there are provided according to the present invention hyper-document information and a method of processing the information in which attribute data common to a plurality of documents are collected without keeping attribute data for each constituent element of the respective documents, thereby specifying the common attribute data from each document constituent element. With this provision, the amount of each document to be kept therein is decreased and the specification amount of document constituent elements is minimized; moreover, maintainability of documents having common characteristics can be improved.

Furthermore, there are provided according to the present invention hyper-document information and a method of processing the information in which, as attribute data for each constituent element of the respective documents, there is used a link attribute specifying another constituent element. Moreover, in an operation to change a reference order according to the link specification, information of the link origin is saved so as to establish a document reference sequence according to a link relationship not conforming to the hierarchic structure, thereby facilitating the return of control to the link origin.

In addition, there are provided according to the present invention hyper-document information and a method of processing the information in which, according to specifications at a point where the user interrupts a document reference operation, the document reference state at the point and the utilization history of the user are saved with correspondences established between the saved items, the user, and the document, thereby enabling the system to restart according to the interrupted state.

Moreover, there are provided according to the present invention hyper-document information and a method of processing the information in which there is disposed means for the user to specify information related to separation and saving of a portion of a document. Referencing the saved information of the utilization progress or history (paths of referenced tree structures and methods of displaying information of the contents) in a range from when the user starts referencing the document up to this point including the interruption, there is acquired and saved a document portion according to the utilization progress of the user.

Furthermore, there are provided according to the present invention hyper-document information and a method of processing the information in which, by specifying the attribute data of the constituent element and by referencing characteristic data of the user or a group of the user or the attribute state data thereof, there can be determined a possibility of reference with respect to a portion of the document for the user at the point of time (determination is not fixed for the document, but a decision is made according to the constituent portion of the document).

In accordance with the hyper-document information and the method of processing the information of the present invention, attribute data is kept for each constituent element of the document represented in a hierarchic tree structure such that the contents of the data are interpreted to determine a method of deciding the next reference position in the constituent unit and a method of displaying the contents of the document indicated by the constituent unit, thereby providing a flexible method of referencing the document.

Furthermore, in accordance with the hyper-document information and the method of processing the information of the present invention, the system keeps characteristics of the user of the document and/or a group to which the user belongs and/or data of general states or situations. Referencing these items as well as the attribute data kept in the constituent units, there can be decided a document reference method including a method of determining a next reference position and a method of displaying the contents of the document, thereby implementing a flexible method of referencing the document.

Moreover, in accordance with the hyper-document information and the method of processing the information of the present invention, a document reference method including a method of determining a next reference position and a method of displaying the contents of the document can be determined according to inquiries to the user of the document and responses thereto in accordance with indications of the attribute data kept in the constituent units. With this provision, there is prepared means for selecting a reference method according to not only the preset data as above but also the will of the user at the reference point, thereby materializing a flexible method of referencing the document.

In addition, according to the hyper-document information and the method of processing the information of the present invention, attribute data common to a plurality of documents is kept independently of the respective documents so that the data is specified from the constituent unit. In a document reference operation, common attribute data is acquired in response to the specification, thereby minimizing the amount of each document to be saved and the specification amount of the document constituent units and improving maintainability of the documents having common characteristics.

Furthermore, in accordance with the hyper-document information and the method of processing the information of the present invention, as attribute data of the document constituent unit, there is employed a link attribute specifying another constituent unit. In a document reference operation, according to the specification, control can be moved to a reference destination of the link specification. In the control moving operation, information of the link origin is saved such that control is returned to the link origin according to the specification of the user at the moving destination. With this provision, there are implemented the hyper-document information and the method of processing the information in which a document reference order is established according to a link relationship exceeding the constraints of the hierarchic structure, and control can be easily returned to the link origin.

Moreover, according to the hyper-document information and the method of processing the information of the present invention, transition of the constituent unit and selection results of the method of displaying information of the contents are sequentially saved as the utilization history or progress at intermediate points of the document reference operation. According to a user's specification at an interruption of a document reference operation, the utilization progress and the document reference state at the point are saved with correspondences established between these items, the user, and the document. Moreover, in response to the user's specification, the saved information can be retrieved so that the interrupted document reference operation is restarted according to the interrupted state by specifying the document reference state.

Furthermore, in accordance with the hyper-document information and the method of processing the information of the present invention, information of the utilization progress is sequentially saved. In response to a user's specification of information related to an operation to separate and to save a portion of a document, the system references progress or history information in a range from when the user starts referencing the document up to the current point including the interruption so as to obtain document portions used by the user and the method of displaying the contents selected in the operation, thereby storing these items as another document. In response to a user's specification thereafter, the document thus saved is referenced, which simplifies the operation.

Moreover, according to the hyper-document information and the method of processing the information of the present invention, by specifying the attribute data of constituent elements and by referencing characteristic data of the user or a group of the user or the state data, there can be determined, for each document constituent unit, a possibility of reference with respect to a constituent unit included in a partial tree of the document having the constituent unit as a root thereof so as to allow or to inhibit the subsequent reference operation depending on the case, thereby controlling security information according to the document constituent portions.

BRIEF DESCRIPTION OF THE DRAWINGS

These and other objects and advantages of the present invention will become apparent by reference to the following description and accompanying drawings wherein:

FIG. 1 is a schematic diagram showing the configuration of a document processing apparatus according to the present invention;

FIG. 2 is a block diagram showing the constitution of the apparatus in an embodiment according to the present invention;

FIG. 3 is a flowchart showing a document regeneration conducted by the apparatus of FIG. 2;

FIG. 4 is a flowchart showing an intention clarifying operation conducted by the apparatus of FIG. 2;

FIGS. 13 and 14 are diagrams respectively showing examples of the reader attribute table;

FIG. 15 is a diagram showing an example of the attribute table related to an output device;

FIG. 16 is a diagram showing an example of the attribute table of a printer;

FIG. 17 is a diagram showing an example of a document amount attribute table to be produced for each official title;

FIGS. 24A and 24B are diagrams showing examples of the configuration of related data;

FIGS. 25A and 25B are diagrams showing examples of the configuration of another related data;

FIG. 26 is a diagram showing an example of the configuration of general related data of the system;

FIG. 28 is a diagram showing an example of history data to be saved in an external storage;

FIGS. 29A and 29B are diagrams respectively showing examples of personal characteristic information and security attribute information;

DESCRIPTION OF THE PREFERRED EMBODIMENTS

Figure 5:
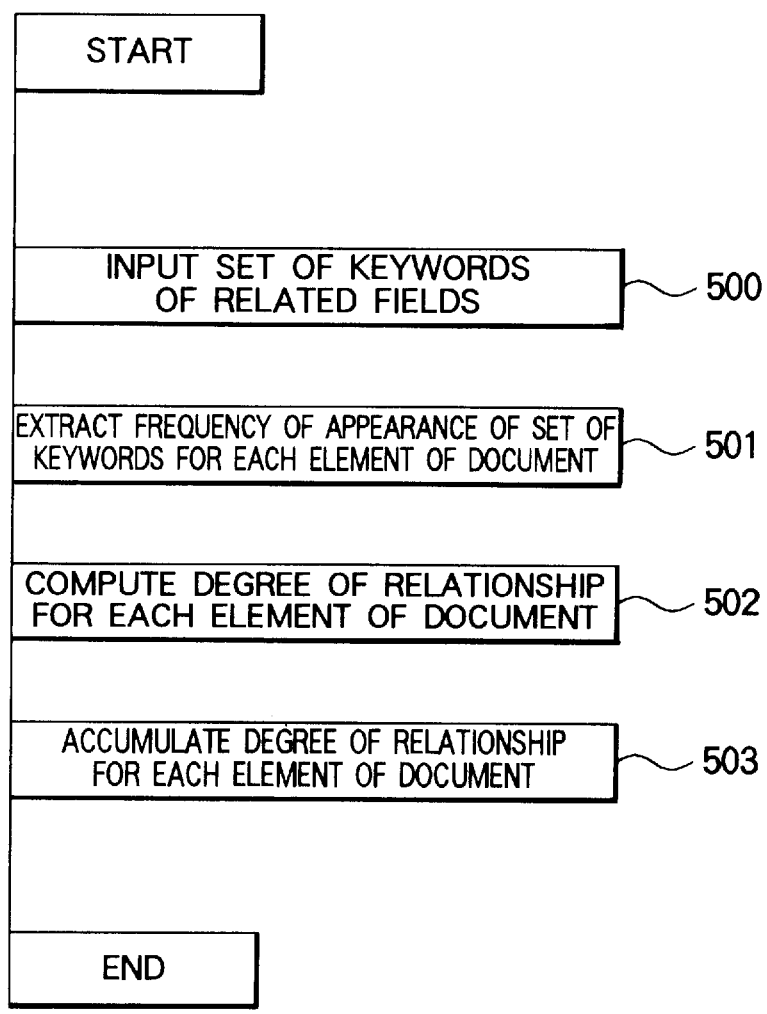
FIG. 5 is a flowchart showing the operation of FIG. 4 to process relationships of intentions.

Description will now be given of an embodiment of the present invention by referring to FIG. 1 schematically showing the structure of a document processing system according to the present invention. In this regard, FIG. 1 is an explanatory diagram generally showing the present invention. A writer terminal 100 is a terminal connected to a network 102 and helps the writer create sentences and input an intention or a requirement and an idea of the writer to the system. A document produced by the writer is transmitted via the network 102 to a reader terminal 101. A document processor 103 is also connected to the network to receive as an input thereto the document generated by the writer so as to process the document and to produce thereby a document matching the intention and idea or a profile of the reader. The reader terminal 101 receives as inputs thereto data items respectively of the intention and idea or a profile of the reader to transmit the items to the processor 103. Moreover, the document thus restructured to match the reader is received by the reader terminal 101 and is displayed thereon. The processor 103 receives the document created by the writer, reconstructs the document in consideration of the reader to prepare a document matching the intention and the like of the reader, and then transmits the obtained document to the reader terminal 101.

A clarifying or deciding section 104 has a function to clarify the intentions of the reader to produce data associated therewith. For this purpose, this section 104 interactively communicates with the reader via the terminal 101 to clarify the intention. An intention interpreting section 105 has a function to combine related fundamental functions of the document processing with each other to execute a sequence of processing steps for the clarified intention. In this connection, the fundamental functions of the document processing such as selection, working, summarization, editing, and translation of documents are beforehand disposed in a fundamental document processing section 106. A sequence of document processing created by combining associated fundamental functions as above is achieved for the document, thereby producing a document oriented to the reader. Namely, a document adapted to the reader is produced by a document output function of a document output section 113. A knowledge base 109 includes various items of knowledge necessary to execute document processing. In a knowledge retrieval section 107, required knowledge items are selected for document processing.

The pertinent knowledge base 109 includes a user knowledge base 114 storing information related to writers and readers, an incident knowledge base 115 for keeping therein various incidents to generate document matching readers, for example, examples of the fundamental functions used for document processing, a world knowledge base 116 in which general knowledge necessary to reconstruct documents is stored, and a language dictionary base 117 including dictionaries of grammar and words of such natural languages used in the system as Japanese and English.

Utilizing these knowledge bases, a sequence of document processing steps are carried out in the section 106. A learning and reasoning section 108 is disposed for the knowledge base 109. According to knowledge acquired from an actual world 125 by a knowledge acquisition section 122, a retrieval is made through the base 109 by the learning and reasoning functions. Moreover, in a media retrieval section 110, an access is made to various document materials stored in an information file 111 to attain desired materials therefrom. In the file 111, there are stored such media as a material image 118, a material text, 119, a material drawing 120, and a material voice and tone 121. Material data from the actual world 125 is received in the form of encoded data or physical data through a pattern recognition such as a character recognition or a voice recognition by a recognition input section 124. The data is then passed to a classification and rearrangement section 112 to be stored in a predetermined area of the file 111. In the storage, the knowledge base 109 and the information file ill are mutually related to each other by a communization section 123.

In this embodiment, a document to be transmitted from a writer via a network to a reader is generated, referenced, and reconstructed according to the intention of the writer and the reader. Naturally, the communication path is not limited to a network. The document need not be sent via a network. For example, there may be employed a method in which the document may be sent to the reader in the form of a storage file such as a floppy disk or a memory card. There may also be used a method in which the intention of the reader is beforehand set to a terminal to be operated by the writer. In a document creating operation, the writer generates or regenerates a document according to the reader's intention. Furthermore, there may be adopted a method in which after receiving a document file in the form of a floppy disk or a memory card, the reader reconstructs the document according to his or her own intention.

FIG. 2 shows the structure of a document processing system connected to a network in an embodiment specifically embodying the present invention. In this construction, a reader terminal 200, a writer terminal 201, a document processing apparatus 202, and a document data file device 203 are linked with a network 204. Each of the terminals 200 and 201 coupled with the network 204 has two functions, including a reader terminal function and a writer terminal function. Consequently, both terminals may be operated by the reader and the writer.

The terminals 200 and 201 respectively include processors 210 and 220, keyboards 211 and 221, displays 212 and 222, printers 213 and 223, main storages 214 and 224, external storages 215 and 225, indication input devices 216 and 226, voice output devices 217 and 227, voice input devices 218 and 228, and pen input or handwriting devices 29 and 229.

In addition, the document processor 202 includes a processor 230, a main storage 231, an external storage 232, a facsimile input device 233, a scanner input device 234, and a character recognition device 235.

Moreover, the file device 203 includes a processor 240, a main storage 241, and an external storage 242.

The writer terminal 100, the reader terminal 101, and the network 102 of FIG. 1 are respectively associated with the terminal 201, the terminal 200, and the network 204 of FIG. 2. The intention clarification function 104, the basic processing section 106, the knowledge retrieval section 107, the media retrieval section 110, the learning and reasoning section 108, the classification and rearrangement section 112, and the communization section 123 are implemented by the processor 230 of FIG. 2. Furthermore, the knowledge base 109 and the information file 111 are stored in the external storage 232 of FIG. 2. The recognition input section 124 is associated with the facsimile facility 233, the scanner device 234, and the character recognition device 235. Moreover, via the network 204, pattern data is inputted to the recognition input section 124 through the voice input device 218 or 228 or the handwriting device 219 or 229.

Description will now be given of a document generating process of writing a document according to the document system. Operating the display 222 and the keyboard 221 of the writer terminal 201, the writer interactively instructs creation of a document via the network 204 to the processor 202. Generating a document according to the instruction, the processor 202 stores data of the prepared document via the network 204 in the file device 203.

Description will be next given of a document reference and reconstruction process in which the document is read according to the document system. Achieving operations from the display 212, keyboards 211, and the like of the reader terminal 200, the reader interactively instructs a document reference processing via the network 204 to the processor 202. In response to the instruction, the processor 202 accomplishes the reference processing. In this situation, the document data beforehand stored via the network 204 in the file device 203 is read therefrom in response to execution of the reconstruction and reference operations.

FIG. 3 is an explanatory diagram showing a document process to regenerate a document adapted to an intention of a reader. In a step 300, an input indication is carried out from, for example, the keyboard 211. Resultantly, document data related thereto is acquired from the file device 203 to be transmitted to the processor 202. Steps 301 to 303 are executed by the processor 202. In a step 304, the reconfigured document is passed to the reader terminal 200 to be displayed on the display 212 and/or to be outputted to the printer 213.

Specifically, a document prepared in advance is inputted to the system in the step 300 and an intention of the reader is supplied in the step 301. The intention thus received is interpreted in the step 302 to convert the requirement into a process including a sequence of basic document processing. In the step 303, the process is executed to reconstruct the document. Next, in the step 304, the regenerated document is outputted to a printer or is displayed on a display screen.

FIG. 4 shows a diagram for explaining an embodiment of a processing procedure to clarify or to decide an intention of the reader. In a step 400, a requirement of the reader is inputted in a natural language from the keyboard 211 and/or the indication input device 216 of the reader terminal 200. Steps 401 to 408 are executed by the processor 230 of the document processing apparatus 202.

More concretely, a requirement is inputted in a natural language in the step 400 and then the kind of intention is determined through the steps 401 to 408. In this example, as for the kinds of intention, there are checked characteristics related to validity, future, interest, relationship, analogy, rarity value, synonymity, and higher-level and lower-level concepts.

In the step 401, a check is made to determine whether or not the intention indicates validity. In the step 402, whether or not a characteristic of future is indicated is decided. The step 403 determines whether or not the intention is related to interest. The step 404 decides whether or not a relationship is designated. The step 405 checks to determine whether or not an analogy is indicated. The step 406 decides whether or not synonymity is denoted. The step 407 determines whether or not the intention designates higher-level and lower-level concepts. In this connection, there may be adopted a method in which the intention of the reader is beforehand specified to be stored in a portable storage such as a memory card such that in a reading operation, the reader supplies the intention therefrom to the document system to regenerate the document according to the intention. Moreover, a plurality of intentions may be beforehand stored so that the reader selects one of the intentions in the reading operation. The intention may be interactively selected or may be automatically selected according to, for example, a daily schedule of the reader.

In the step 401, a check is made to determine whether or not the data inputted in the natural language includes any words related to validity. For this purpose, there is disposed a group of words associated with validity for collation thereof. Assume that there are provided, for example, "yuyo (Japanese; usefulness)", "yakudatsu (Japanese; useful)", and "tekiyo (Japanese; application)" as the words related to validity. If the data of the natural language is "ninshiki gijutsu ni yakudatsu bunsho o yomitai (Japanese; it is desired to read documents useful for a recognition technology)", the word "yakudatsu (useful)" is included in the natural-language sentence. Consequently, it is decided that the kind of intention denoted is validity.

In the step 402, whether or not the sentence contains words related to characteristics of the future is checked. To this end, there is beforehand provided a group of words associated with characteristics of future for collation thereof. Assume that there are provided, for example, "shorai (Japanese; future)", "mirai (Japanese; future)", and "21 seiki (Japanese; 21st century A.D.)" as the words related to characteristics of the future. If the data inputted in the natural language is "21 seiki no shakai no arikata ni kansuru bunsho o yomitai (Japanese; it is desired to read documents related to the ideal way of the society in the 21st century A.D.)", the words "21 seiki (21st century A.D.)" are included in the natural-language sentence. Consequently, it is determined that the kind of intention is associated with characteristics of the future.

For the judgment step 403, there are beforehand registered keywords of interesting fields of the respective readers. A check is made to decide whether or not the inputted data of the natural language contains the pertinent keyword.

For the step 405, there are disposed keywords beforehand specified and a dictionary of analogous words. This step checks to determine whether or not the inputted natural-language data contains the pertinent keyword or analogous words thereof obtained from the dictionary. For the steps 407 and 408, there are disposed a dictionary of synonymous words and a thesaurus of higher-level and lower-level concepts, thereby making a check for synonymity and the like.

FIG. 5 is a flowchart showing an example of the operation process of determining whether or not an intention indicates a relationship. This processing is accomplished by the processor 230 of the document processing unit 202.

In a step 500, a set of keywords of the related fields is beforehand inputted to the system. In a step 501, for each portion of a document generated in advance, namely, for each document element, an appearance frequency of the set of keywords is computed. In a step 502, according to the frequency values, a relationship degree is calculated for each document element. According to the degree, it is decided whether or not the intention is related to the element. In a step 503, the relationship degrees are accumulated for each document element.

Figure 6:
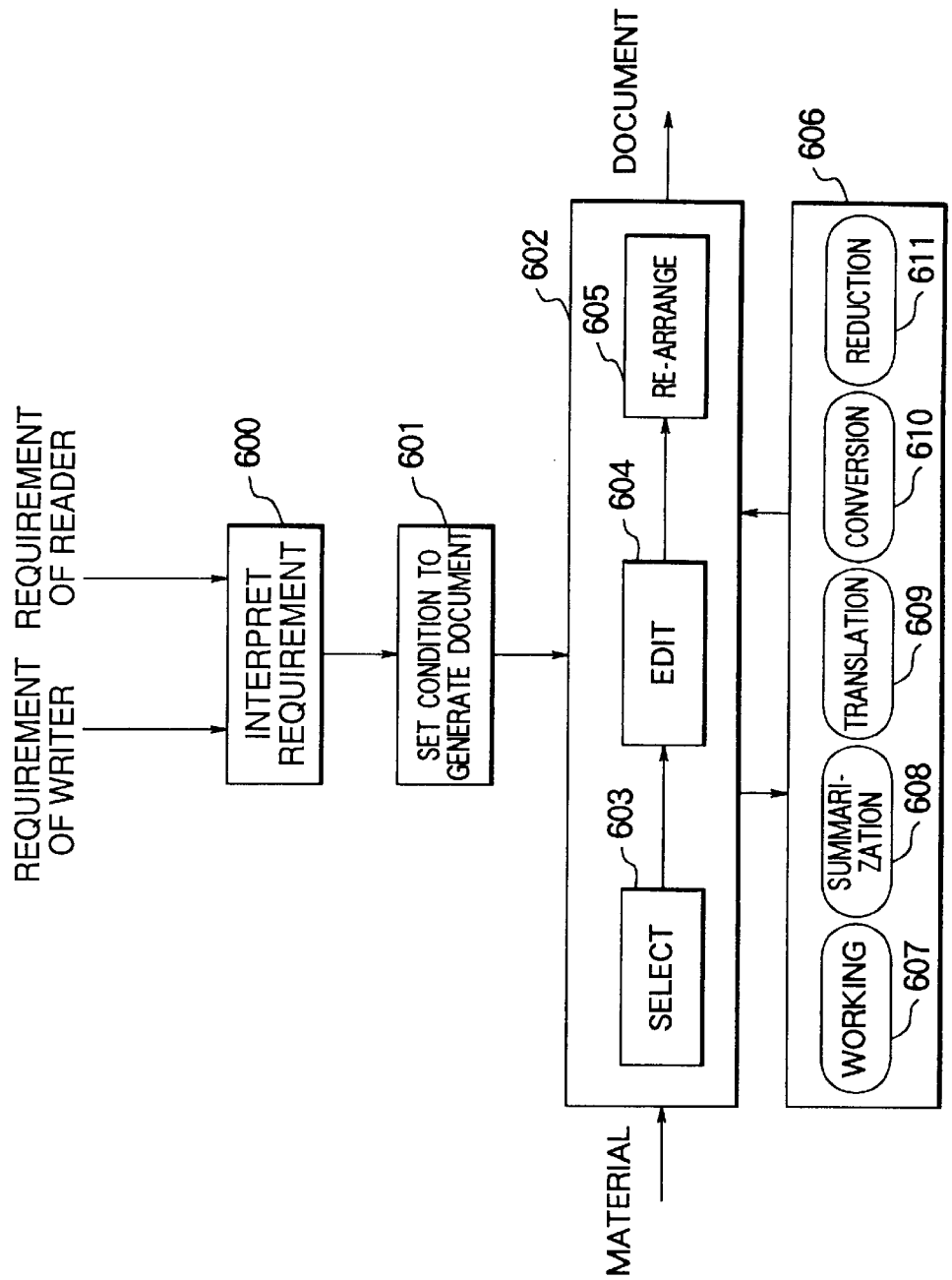
FIG. 6 is a diagram schematically showing the configuration to produce a document matching an intention in another embodiment according to the present invention.

FIG. 6 is an explanatory diagram schematically showing the construction of another embodiment of the document processing apparatus in which a document is generated to match an intention. An intention of the writer is inputted from the terminal 201, whereas an intention of the reader is inputted from the terminal 200. The inputted intentions are transmitted via the network 204 to the document processing unit 202. In the document processing unit 202, the processor 230 includes an intention interpretation part 600, a document generating condition setting part 601, a document processing part 602, and a basic function part 606.

In the part 600, each of the intentions respectively from the writer and the reader is interpreted to be a sequence of basic processing steps suitable for document processing. In the step 601, according to the condition to generate the document, execution of the part 602 is controlled. In this case, from the materials of a document, there are selected those matching the intentions. Next, in an editing part 604 achieving basic functions of the document processing, the selected materials are edited through such operations as working, summarizing, and translation. In an arrangement part 605 to determine a layout of each document element, a document is created or reconstructed and is then outputted therefrom. In this regard, the basic function part 606 includes a working part 607, a summarizing part 608, a translation part 609, a conversion part 610, and a reduction part 611. Each part is to be called for execution thereof by the processing part 602. In the part 608, the text of a document is summarized to minimize the length of the text. This processing may be in quite a simplified form, for example, "Remove all statements of the text other than the first statement". The most important sentence appears in the first part of a text in many cases and hence is adopted as the summarized sentence. In the part 610, there is achieved a conversion of the configuration of a document such as a media conversion of a document. For example, a text is converted into voices and tones; alternatively, kana letters are given alongside difficult Chinese characters of a text. In the part 611, the amount of the document is decreased, for example, a ten-page document is reduced to a one-page document. There may be adopted a method of reducing the document amount described in pages 33 to 40 of the "Character String Replacing Algorithm" written by Tsuda et al in the Journal of Information Processing Society of Japan, Vol. 91, No. 80 (NL-85), 1991.

Figure 7:
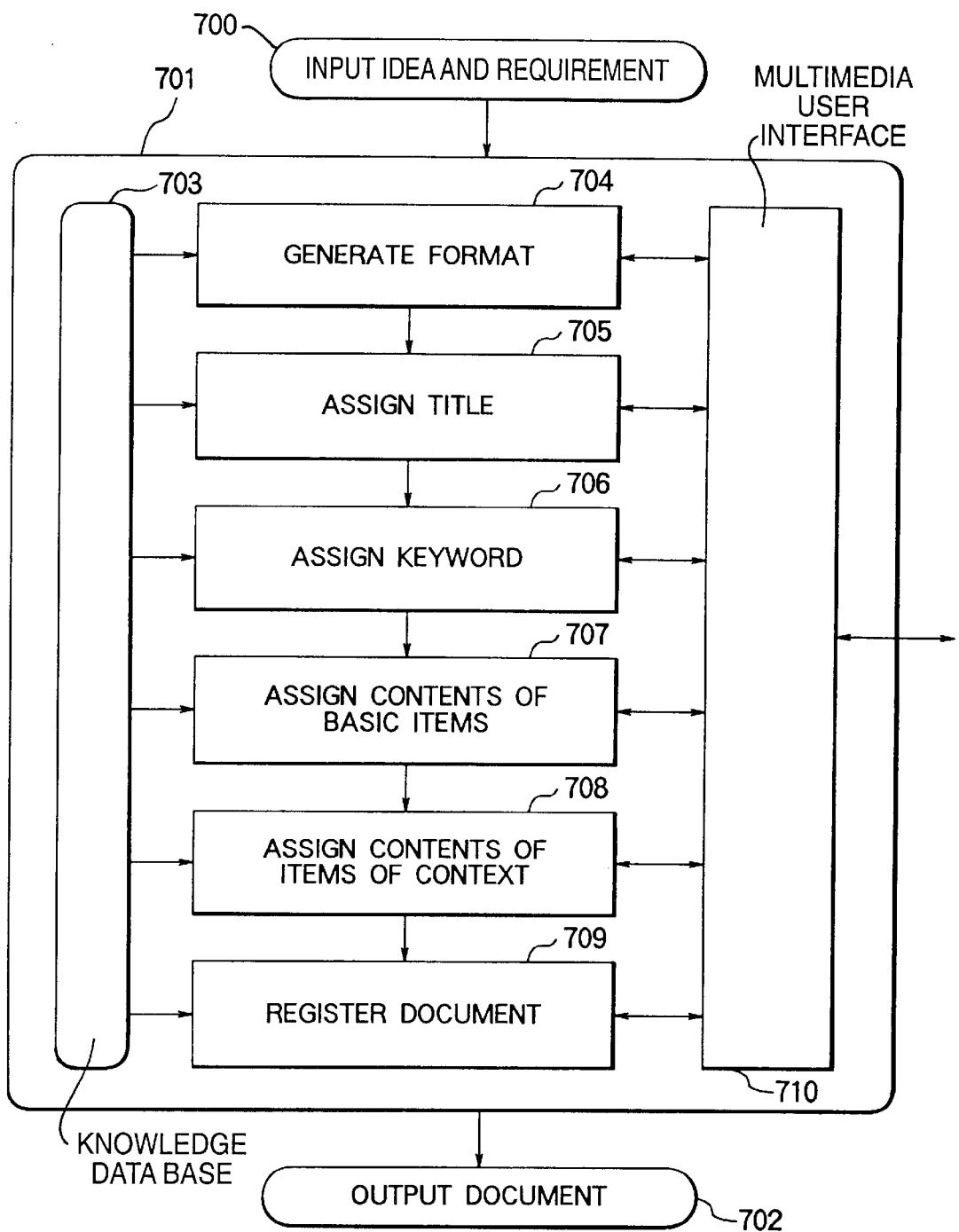
FIG. 7 is a diagram showing the configuration of another embodiment for regenerating a document according to the present invention.

FIG. 7 shows an explanatory diagram schematically showing another embodiment of the document processing to regenerate a document.

The document processing includes a process to create a document according to an intention of a writer and a process to reconstruct the document according to an intention of a reader. Description will be now given of the process to reconstruct the document in accordance with the reader.

An idea or intention of the reader is inputted in the step 500 from the reader terminal 200. The intention is sent via the network 204 to the document processor 202 so as to achieve a sequence of processing steps 704, 705, 507, and 508. In this situation, a knowledge data base 503 corresponds to the knowledge base 109 of FIG. 1 such that knowledge data acquired by the knowledge retrieval section 107 is used in the sequence of processing steps. A multi-media user interface 710 includes a display, a keyboard, etc. of the reader terminal 200 for the reader to interactively input an instruction to reconfigure a document. The resultant document as an output therefrom 702 is printed on sheets of paper by a printer connected to the terminal 200.

Subsequently, description will be given of a process to generate a document according to an intention of a writer. An intention of a writer is inputted in a step 700 from the writer terminal 201. The intention is sent via the network 204 to the document processing unit 202 to achieve a sequence of processing steps 704, 705, 706, 707, and 708. A multi-media user interface 710 includes a display, a keyword, etc. of the writer terminal 210 for the writer to interactively input an instruction to create a document. The resultant document as an output therefrom 702 is printed on sheets of paper by a printer connected to the terminal 201, thereby obtaining the generated document.

In the configuration, an idea or an intention 700 is inputted to a document system 701. In response thereto, a document format is created in the step 704. In this situation, from a knowledge data base 703 containing document formats associated with intentions and ideas, there is selected a document format for the intention. Moreover, the data base 703 further contains materials of document elements, a set of keywords, titles, basic items of documents, and context items such as logical structures. In the step 705, a document title is assigned in conformity with the intention of the reader. In this case, a title beforehand assigned to the document produced by the writer is replaced with another title matching the intention of the reader.

Furthermore, in the step 706, a keyword is assigned to each document element. In this example, for each document element, a character string collation is achieved through a set of keywords beforehand specified by the reader to assign a keyword to the element. In the basic item assigning step 707, of the basic items of the received document, only those desired by the reader are assigned. For example, in a case of proceedings, the basic items include a date of conference, a location thereof, attendants, etc.

In relation to the context item assigning step 708, as context items, there are beforehand set, for example, "mokuteki (Japanese; object), ketsuron (Japanese; conclusion), sanko (Japanese; contents), mondaiten (Japanese; problem), nittei (Japanese; schedule)"; "jijitsu (Japanese; fact), iken (Japanese; opinion)"; "joron (Japanese; introduction), honron (Japanese; main subject), ketsuron (Japanese; conclusion)"; "ki (Japanese; introduction of idea), sho (Japanese; initiating section), ten (Japanese; developing section), ketsu (Japanese; conclusion)"; and "5W1H". In this part 708, content items desired by the reader are assigned to the respective document items. For this purpose, to determine the desired items, these items may be displayed on the screen for the reader to select such necessary items.

When assigning the context items to the document elements, there may also be employed a method in which meanings are obtained in the natural language processing to accordingly extract contexts. Alternatively, for example, a search is made through character strings of a text for a word "mokuteki (Japanese; object)" to determine that a document element containing the pertinent word is an objective item in the context items. The document thus reconstructed to match the intention of the reader is subjected to a document registration in a processing part 709. To interactively carry out the processing via the screen, the system 701 includes the multi-media interface 710. Resultantly, a document 702 is outputted from the system to a printer or is presented on a display.

Figure 8:
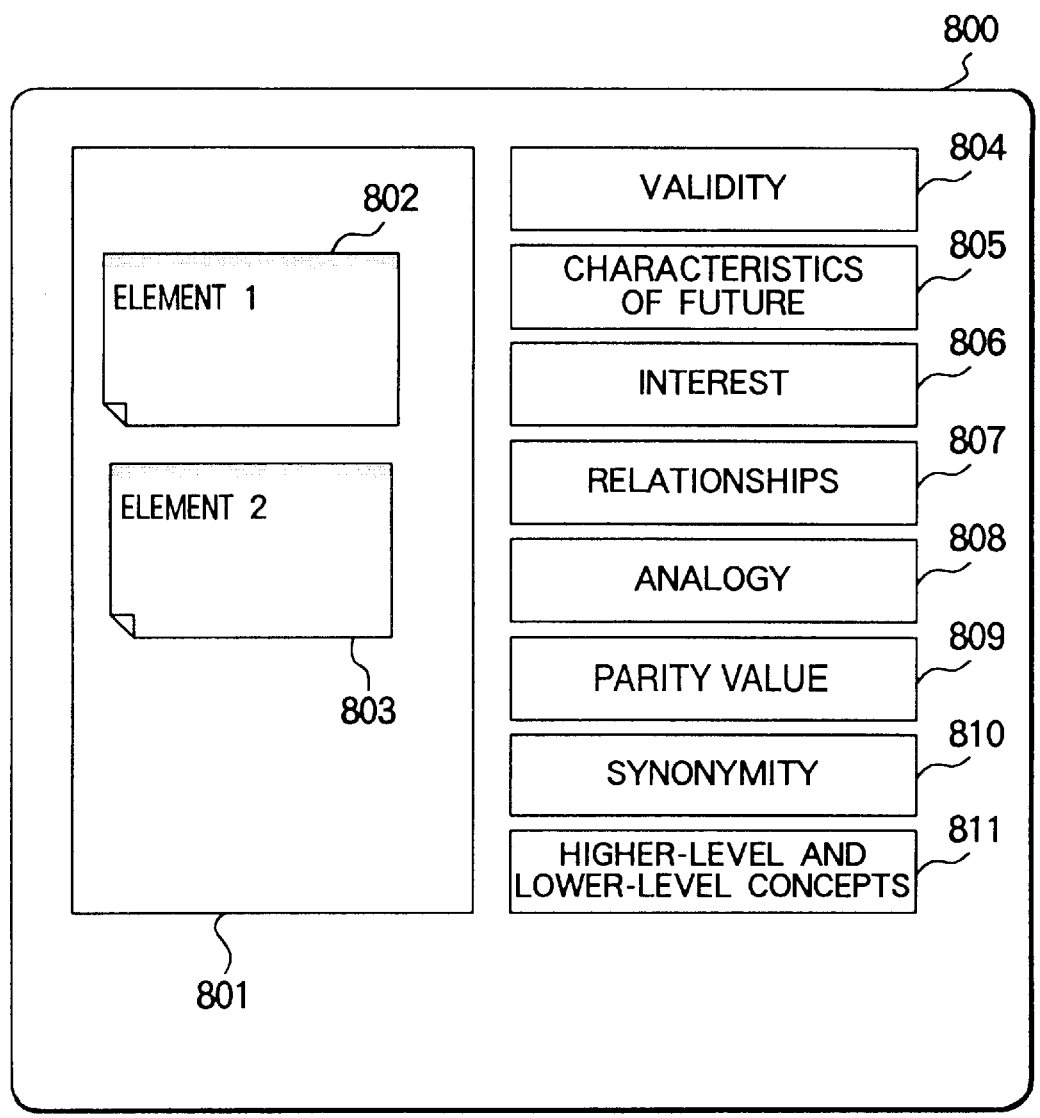
FIG. 8 is a diagram showing an example of the display screen of a reader terminal.

FIG. 8 is an explanatory diagram showing an operation to regenerate a document according to an intention of a reader when the reader references the document.

In this diagram, a display screen 800 corresponds to a screen of the display 212 of the reader terminal 200 of FIG. 2.

On the screen 800, there are presented menu items 804 to 811 as intentions of the reader. Specifically, these items are associated with validity, characteristics of the future, interest, relationships, analogy, rarity value, synonymity, higher-level and lower-level concepts, respectively. When the reader selects a desired item therefrom, document elements associated with the selected intention are acquired to be displayed in a document display window 801. Accordingly, it is possible to display only the documents or document elements matching the intention of the reader. Namely, the other documents not related to the intention are removed from the objects of the processing. This helps the reader effectively read documents and judge the contents thereof.

Figure 9:
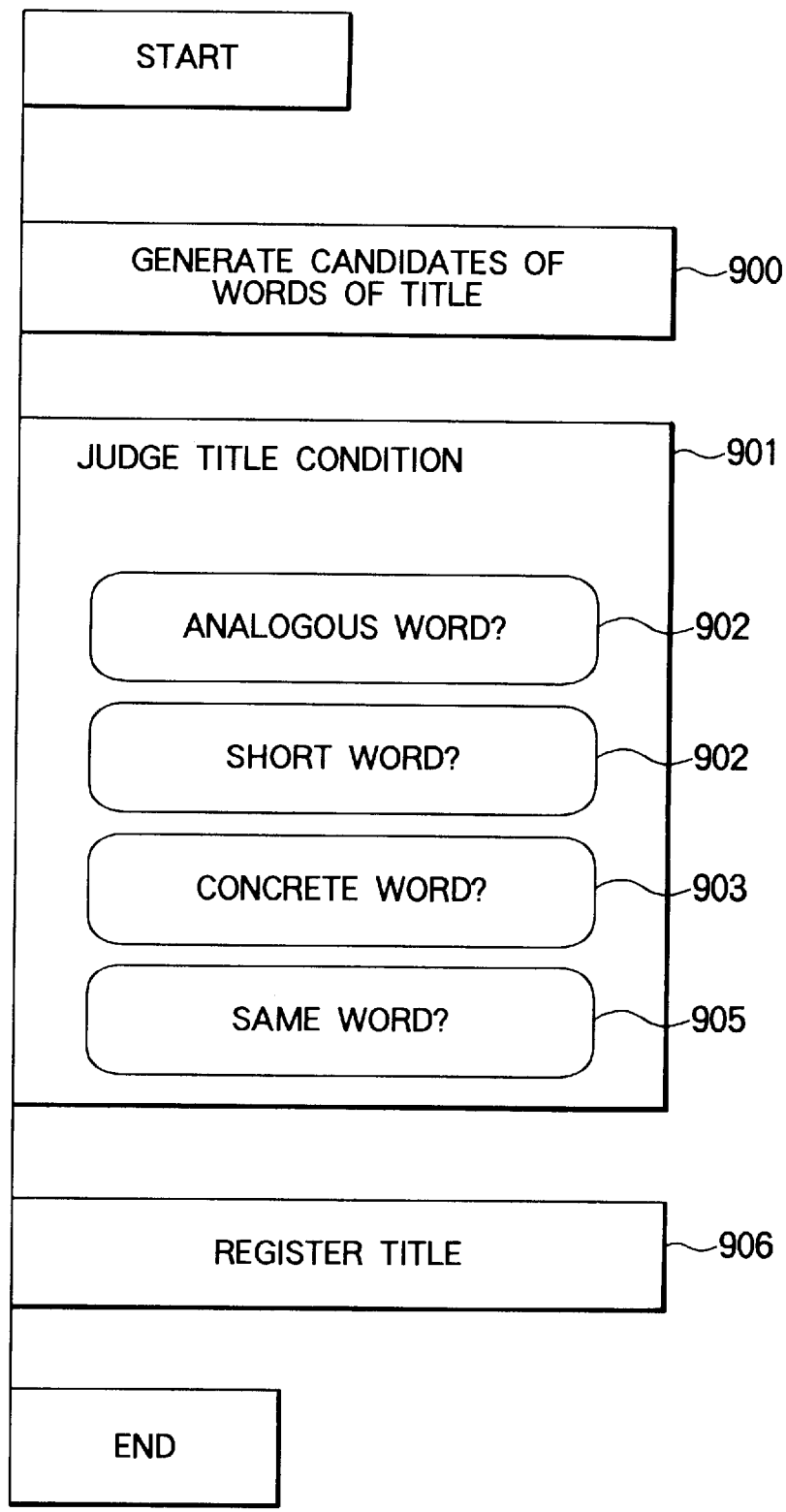
FIG. 9 is a flowchart showing the operation to assign titles.

FIG. 9 is a diagram for explaining a processing procedure to assign a title of a document. The processing is executed by the document processing unit 202 of FIG. 2, and the assigned title is stored as a document data item in the document data file device 203.

In this processing, there is assigned a title matching the intention of the reader. However, the processing may also be adopted to help the writer of a document assign a title to the document. In a step 900, candidate words are generated for the title. For the title set by the reader, there are created the candidate words of a new title according to the intention of the reader. In a step 901 to decide conditions of the title, there are beforehand set four conditions including a condition 902 "no analogous word", a condition 903 "short word", a condition 904 "concrete word", and a condition 905 "different word". When these conditions are satisfied, the title is registered in a step 906.

Figure 10:
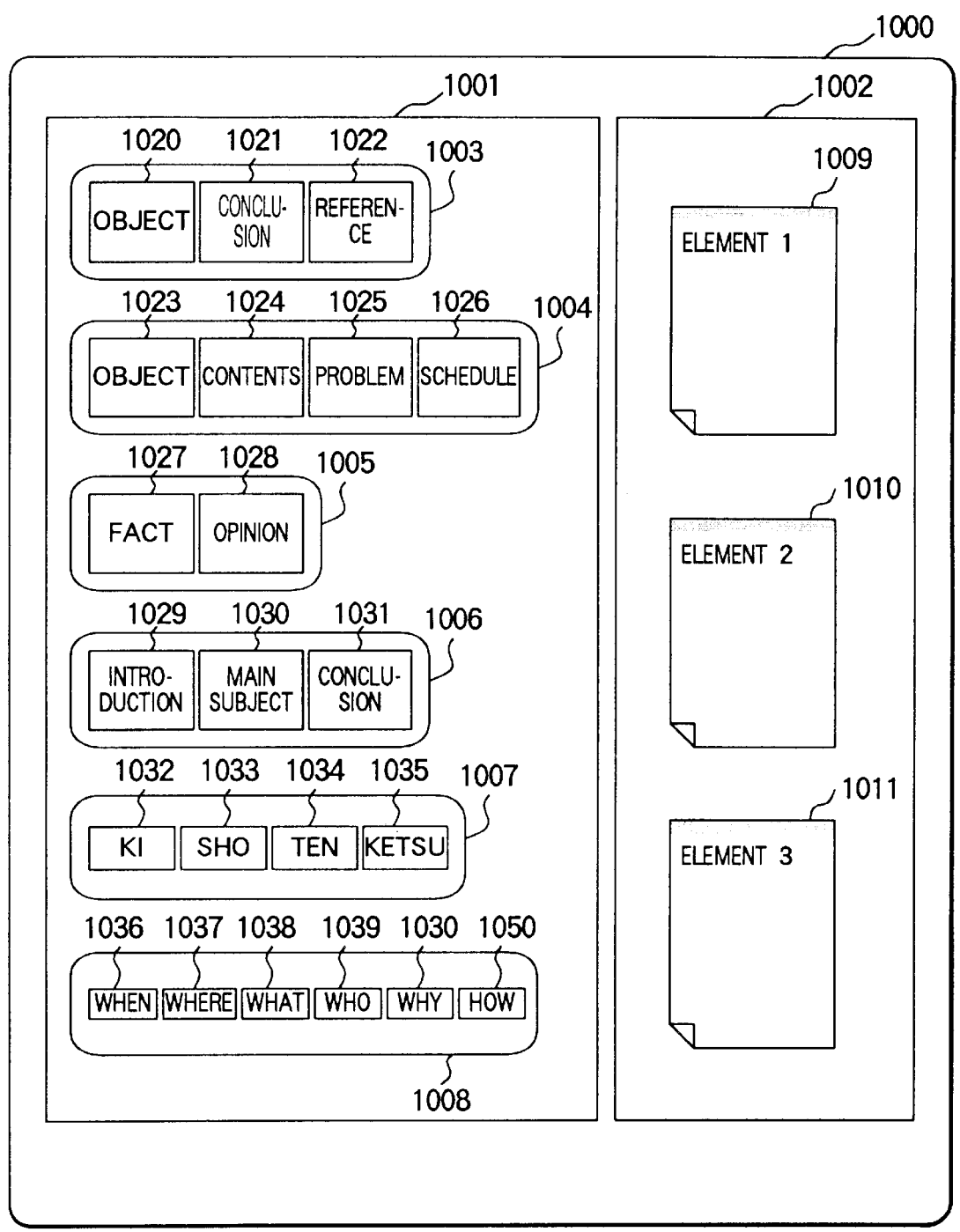
FIG. 10 is a diagram showing an example of the screen operation to set context items of a document.

FIG. 10 shows an example of an operation to select an intention of a writer when the writer creates a document. In this connection, the processing may be similarly conducted when the reader re-configures the document.

The screen of the display 212 of the reader terminal 200 corresponds to a screen 1000.

On the terminal screen 1000, there are presented a context item selecting window 1001 and a document element display window 1002. In the window 1001, context items are displayed in the format of a menu. There are displayed, for example, an item 1005 "mokuteki (Japanese; object), ketsuron (Japanese; conclusion), sanko (reference)", an item 1004 "mokuteki (Japanese; object), naiyo (Japanese; contents), mondaiten (Japanese; problem), nittei (Japanese; schedule)", an item 1005 "jijitsu (Japanese; fact), iken (Japanese; opinion)", an item 1006 "joron (Japanese; introduction), honron (Japanese; main subject), ketsuron (Japanese; conclusion)", an item 1007 "ki (Japanese; introduction of idea), sho (Japanese; initiating section), ten (Japanese; developing section), ketsu (Japanese; conclusion)", and an item "5W1H". When the user selects a context item therefrom, the item is specified in the system. Moreover, the context items include subordinate menu items 1020 to 1050. When one of the subordinate menu items is selected, associated document elements 1009, 1010, and 1011 are displayed in the window 1002. Consequently, for example, the item 1004 "mokuteki (Japanese; object), naiyo (Japanese; contents), mondaiten (Japanese; problem), nittei (Japanese; schedule)" is first selected as a context item and the item 125 "mondaiten (Japanese; problem)" is chosen as a subordinate item, and document elements related to the problem are displayed in the window 1002.

Figure 11:
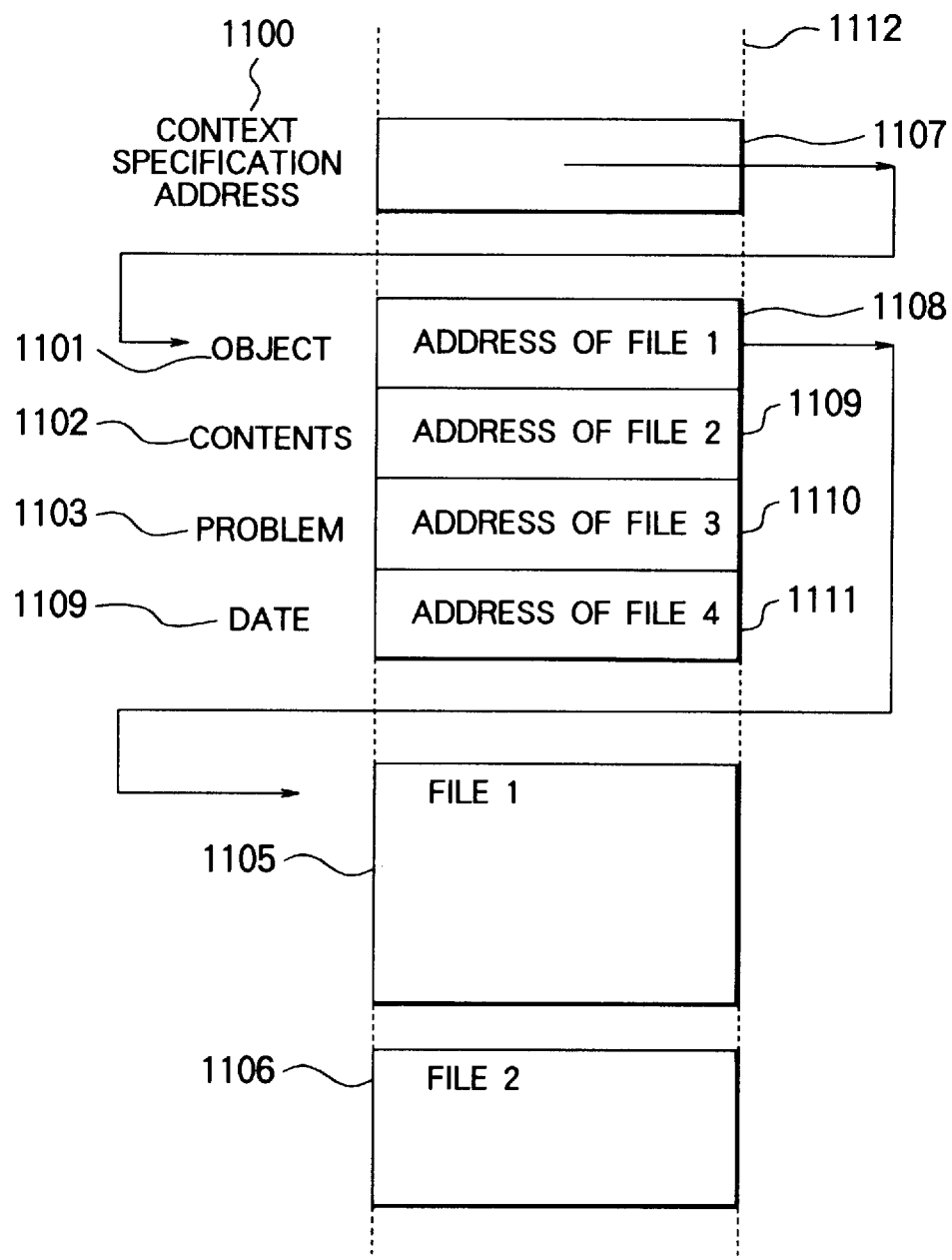
FIG. 11 is a diagram showing the configuration of an example of the storage format of document data.

FIG. 11 is a diagram to explain the data format used to store document data corresponding to content items. The data is stored in the external storage 242 of the file device 203 of FIG. 2.

In a memory 1112 configured in a one-dimensional fashion to be accessed according to addresses, there are stored document elements. In a memory 1107 indicated according to a context specification address 1100 corresponding to each type of context item, there are stored first addresses 1108 to 1111 respectively of files in which the contents respectively of an item 1001 "mokuteki (Japanese; object)", an item 1102 "naiyo (Japanese; contents)", an item 1103 "mondaiten (Japanese; problem)", and an item 1104 "nittei (Japanese; schedule)" are stored. Consequently, in a file 1 denoted by reference numeral 1105, there are stored the contents of a document element associated with the object. The first address thereof is stored in an area indicated by the address 1108 thereof. Similarly, in an area denoted by an address 1102 associated with the contents, there are stored the first address 1109 of the file 2. The body of the contents is stored in the file 2 indicated by reference numeral 1106. Since the document elements are independently controlled as above in this data format, it is possible to display a desired document element by specifying a context item associated therewith.

Figure 12:
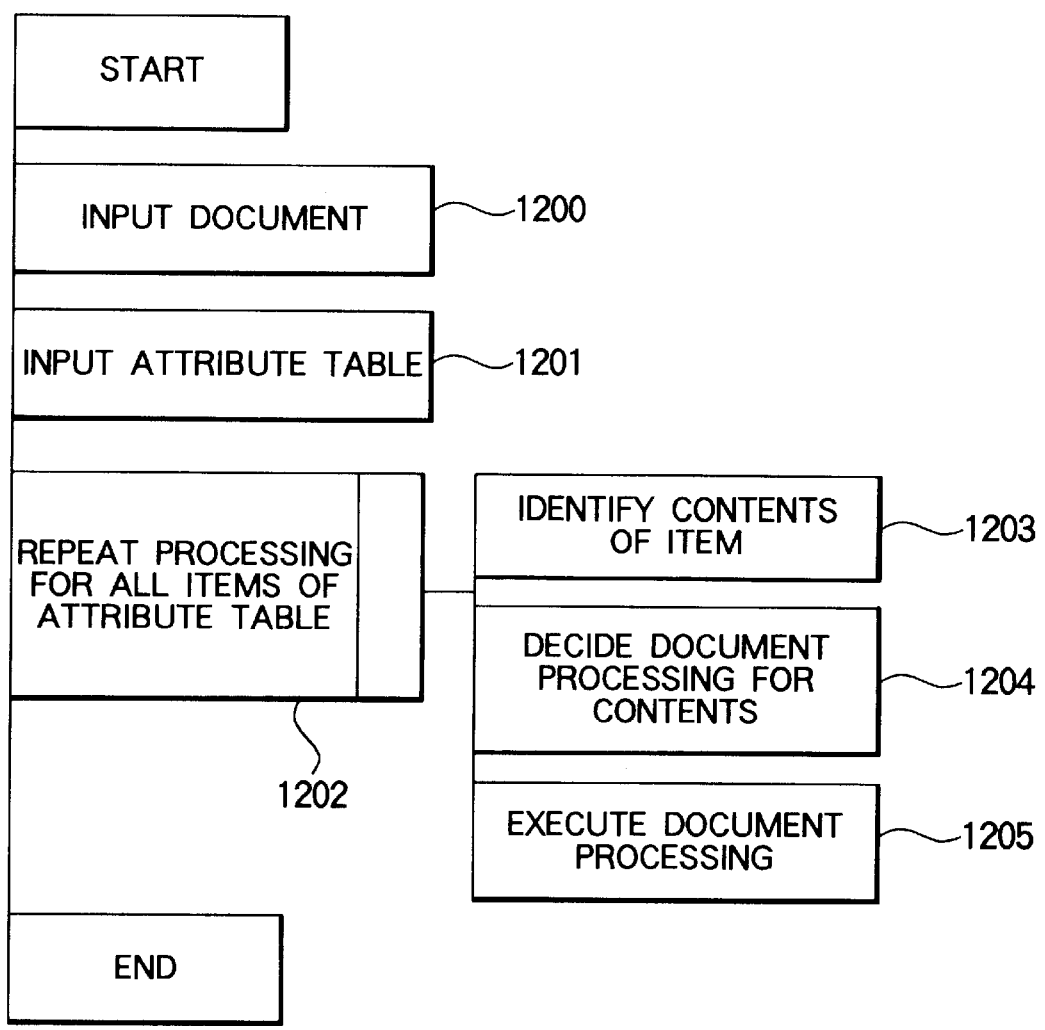
FIG. 12 is a flowchart showing document processing according to an attribute table.

FIG. 12 shows a document processing procedure to adapt a document to an attribute state or a level of a reader according to an attribute table. A step 1200 is started by the reader terminal 200 such that a document is read from the external storage 242 of the file device 203 to be sent to the document processing unit 202. Processing steps 1201 to 1205 are executed by the processor 230.

In the step 1200, a received document is inputted to the system. In the step 1201, an attribute table of the reader is supplied to the system. The reader is identified by a user name keyed in, for example, at initiation of the terminal. The reader can therefore input an attribute table set for each reader. Next, as indicated by the step 1202, the processing steps 1203 to 1205 are repeatedly executed until all items of the attribute table are processed. In this operation sequence, the contents of each item are identified in the step 1203, the type of document processing associated with the contents is decided in the step 1204, and the document processing is effected for the input document in the step 1205. As a kind of document processing, there may be conducted processing in which portions desired by the reader are identified or processing in which an order of documents desired by the reader is identified.

Furthermore, the document may be summarized for persons in important positions, the document may be translated into English for foreign readers, an animation conversion may be carried out for children, or a media conversion may be achieved for handicapped persons. In addition, there may be accomplished document processing in which the amount of the output document is controlled according to the reader, a plurality of pages are reduced to one page, or the document is produced according to a predetermined number of pages. Moreover, there may be executed document processing in which a document is re-constructed in conformity with specifications of a terminal and/or facilities of the reader. For example, in a case where the reader uses a telephone set as a terminal, there is conducted a media conversion to output the text in the form of synthesized voices. Furthermore, when the reader adopts a facsimile apparatus as a terminal, the document data is converted into raster images to be transmitted to the facsimile device. In addition, when the display of the reader terminal has a low resolution, the document may be displayed in a minimized form or the document may be presented in a plurality of screens. Namely, the document data is re-constructed to match the display of the reader.

FIG. 13 shows an example of the attribute table of a reader. This table is stored in the external storage 232 of the document processor 202 of FIG. 2.

The attribute table 1300 includes fields of items and contents, respectively. In this example, an official title 1301 of the reader denotes "division manager" at 1305, an age 1302 indicates "58 (years old)" at 1306, and a language used 1303 designates "Japanese language" at 1307. In this operation, an output device 1304 is denoted as "display 1" at 1308. FIG. 14 similarly shows an example of the attribute table of a reader and is also stored in the storage 232. In this table 1400, an official title 1301 of the reader denotes "school boy" at 1405, an age 1402 indicates "10 (years old)" at 1406, and a language used 1403 designates "English" at 1407. In this case, an output device 1404 is denoted as "display 2" at 1408.

FIG. 15 shows an example of the technical specification table related to an output device and is stored in the storage 232. For example, this table 1500 includes detailed technical specifications of the display 2 (1408). As for items thereof, a resolution 1501 denotes "50 dots per inch (dpi)" at 1500, a number of display colors 1502 indicates "256" at 1505, and a screen display size 1503 designates "1280 (horizontal pixels)×1024 (vertical pixels)" at 1506. FIG. 16 shows another example of the technical specification table related to an output device. In this example, the table 1600 is related to a printer. In the table 1600, a resolution 1601 denotes "400 dpi" at 1604, a number of display colors 1602 indicates "3" at 1605, and a screen display size 1603 designates "A3" at 1603.

FIG. 17 shows an example of the attribute table indicating the amount of a document to be produced for each official title. The table is stored in the storage 232. Each entry thereof includes an official title item 1701 and an output document amount item 1702. In this case, for example, the number of document sheets is 0.2 when the official title 1701 is "office manager" at 1703. The numbers are 0.5, 1.0, 2.0, and 5.0 for "division manager" at 1704, "section manager" at 1705, "group leader" at 1706, and "members" at 1707, respectively. Accessing this table, it is possible to set the document amount in terms of sheets of paper according to the official title of the reader.

Figure 18:
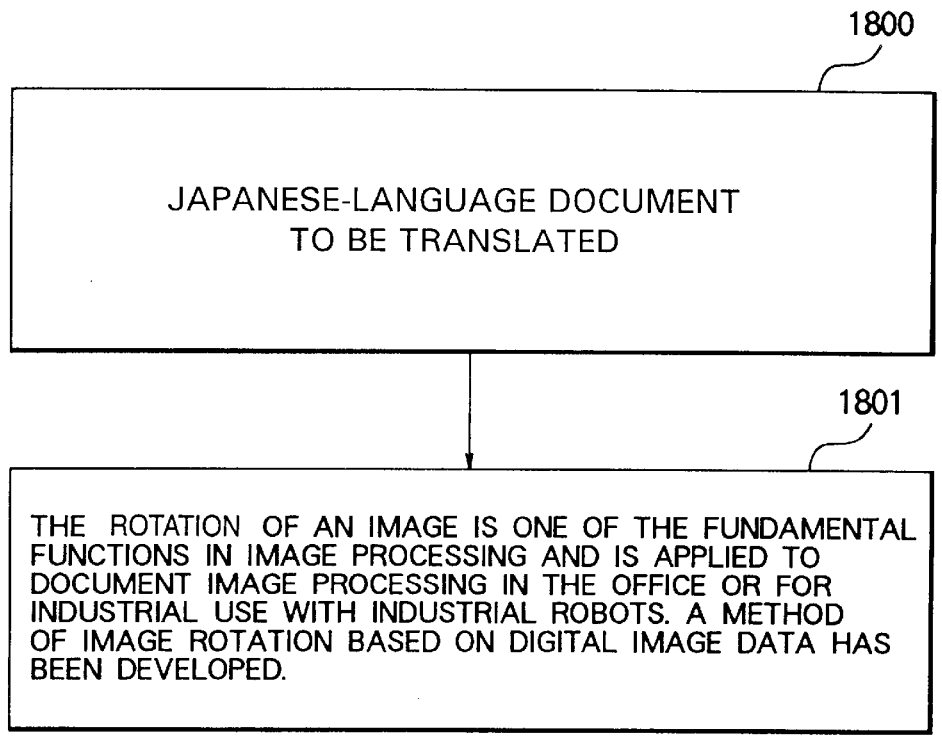
FIGS. 18 to 22 are diagrams showing examples of regenerated documents.

FIG. 18 shows an example of re-generation of a received document. When a document 1800 created by a writer is received, if the language item contains "English" in the attribute table of the reader, there is conducted a machine translation as indicated by a number 1801 to thereby re-construct the document into an English document. In this connection, the document translation can be achieved by any known technology. For example, the technologies described in JP-A-4-31966 and JP-A-3-244077 may be employed for the translation.

Figure 19:
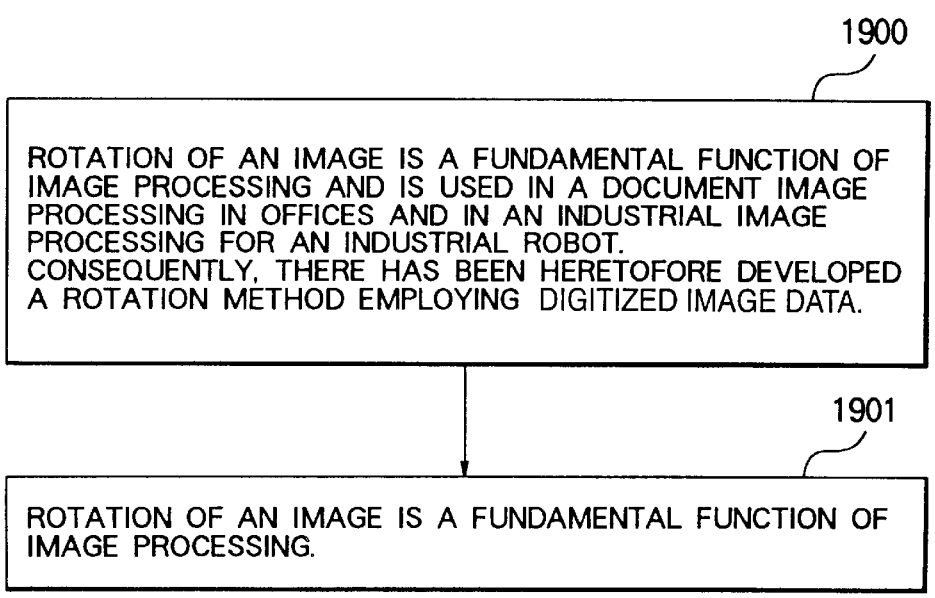

FIG. 19 shows another example of re-construction of a document. For the document 1900, when the official title of the reader is specified as "important person", the document is summarized as denoted by a number 1901, thereby outputting the summary of the document. In this example, the first sentence is extracted from the received document and then a portion thereof is edited to create the summarized sentence. In this regard, the document may be summarized according to a method, for example, described in JP-4-74259. According to the embodiment as described above, a summary is produced and hence there is obtained an advantageous effect that the receiver of the summarized sentence can read the document in a short period of time to rapidly carry out a decision-making job.

Figure 20:
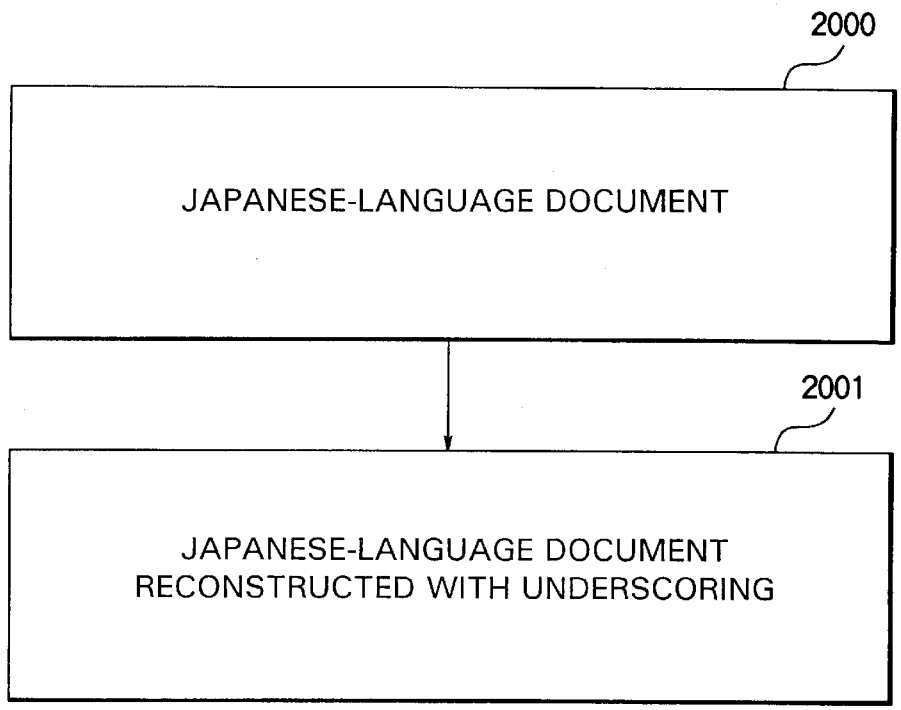

FIG. 20 shows another example of re-construction of a document. For the document 2000, there is created a document 2001 in which pertinent portions thereof are underscored. In this case, each portion of the document which is a matter of concern for the reader is automatically underlined. In this example, any words associated with a set of keywords specified by the reader in advance are retrieved to be thus underscored. Naturally, a character string which is a matter of concern may be displayed in a reserve display mode or in other colors. This leads to an advantage that the reader can efficiently and rapidly read the portions of the document drawing the attention of the reader.

Figure 21:
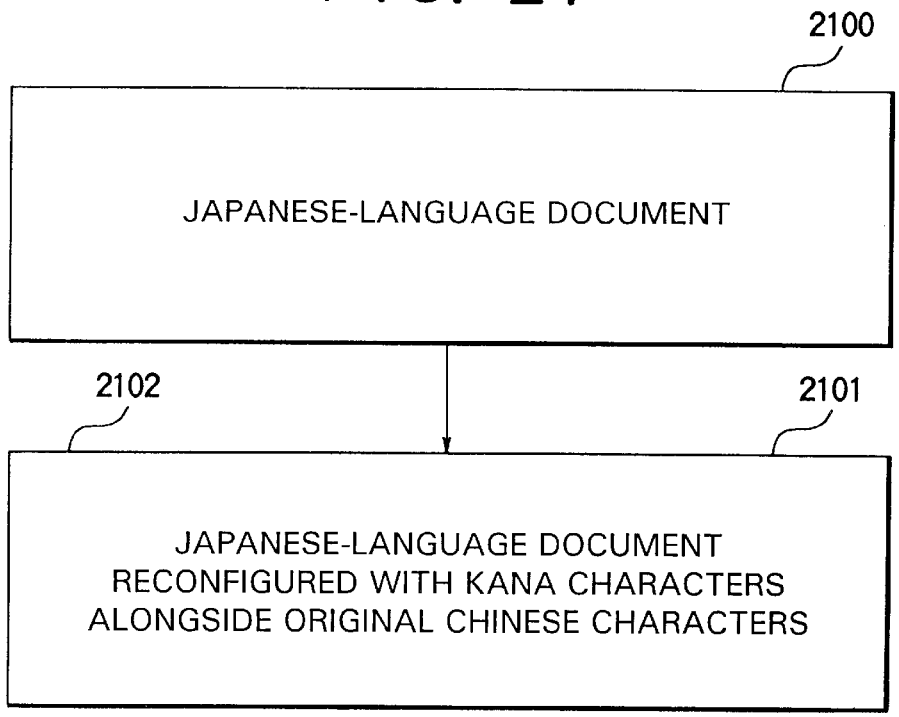

FIG. 21 shows still another example of re-configuration of a document. According to a document 2100, there is produced a document 2101 in which kana characters are printed alongside difficult Chinese characters. In this example, the document 2100 is re-generated according to the level of the reader. Specifically, as an attribute of the reader, the system recognizes that it is impossible for the reader to understand how to read Chinese characters and hence there are given kana letters alongside the Chinese characters. Naturally, without using Chinese characters, the system may convert the document so that the contents thereof are written only with kana characters. This leads to an advantageous effect that even a reader who cannot understand how to read Chinese characters can understand the document.

Figure 22:
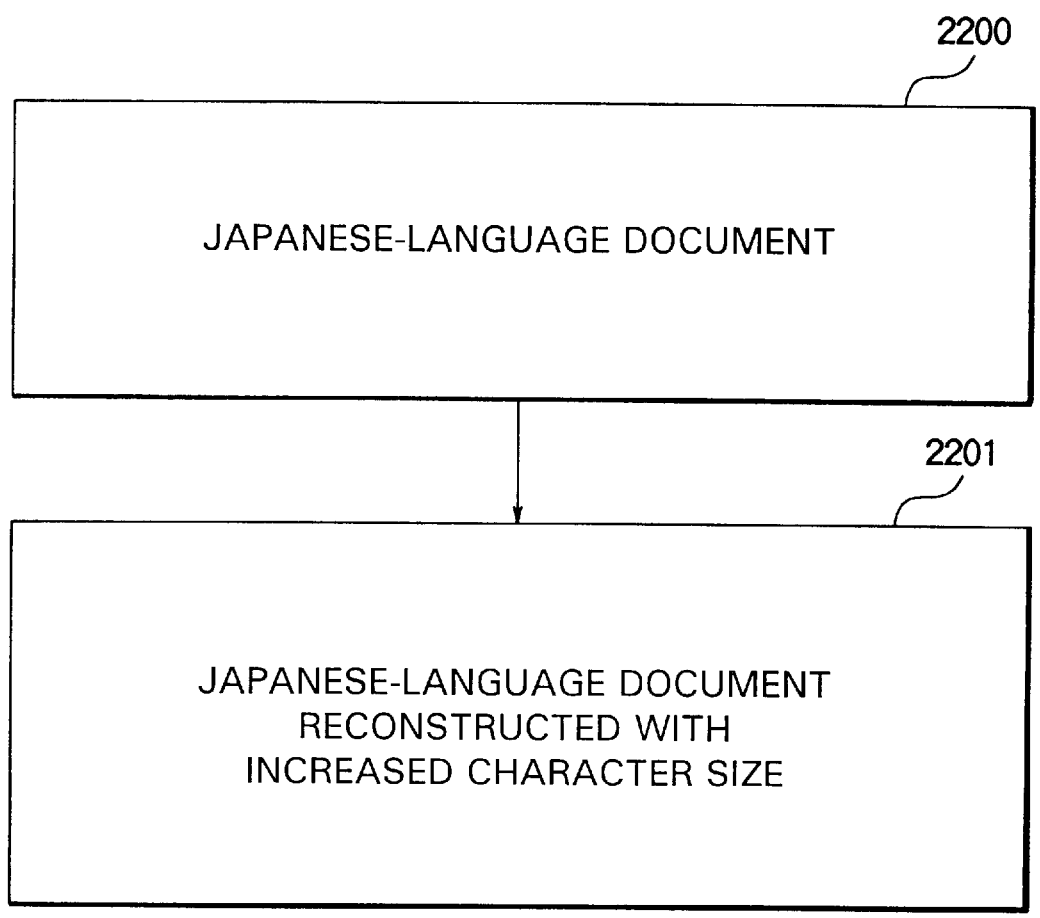

FIG. 22 is another example of re-construction of a document. Based on a document 2200, there is created a document 2201 in which the character size thereof is increased. In this example, according to the age or the visual power of the reader specified as an attribute of the reader, the system sets a character size suitable for the attributes, thereby producing the document. As above, there is generated a document adapted to the profile of the reader so as to thereby advantageously provide an easy-to-read document for the reader.

Subsequently, description will be given of an embodiment of document information processing in the document processor of FIG. 2 wherein hyper-documents are referenced and re-configured on the reader side according to the present invention.

Figure 23:
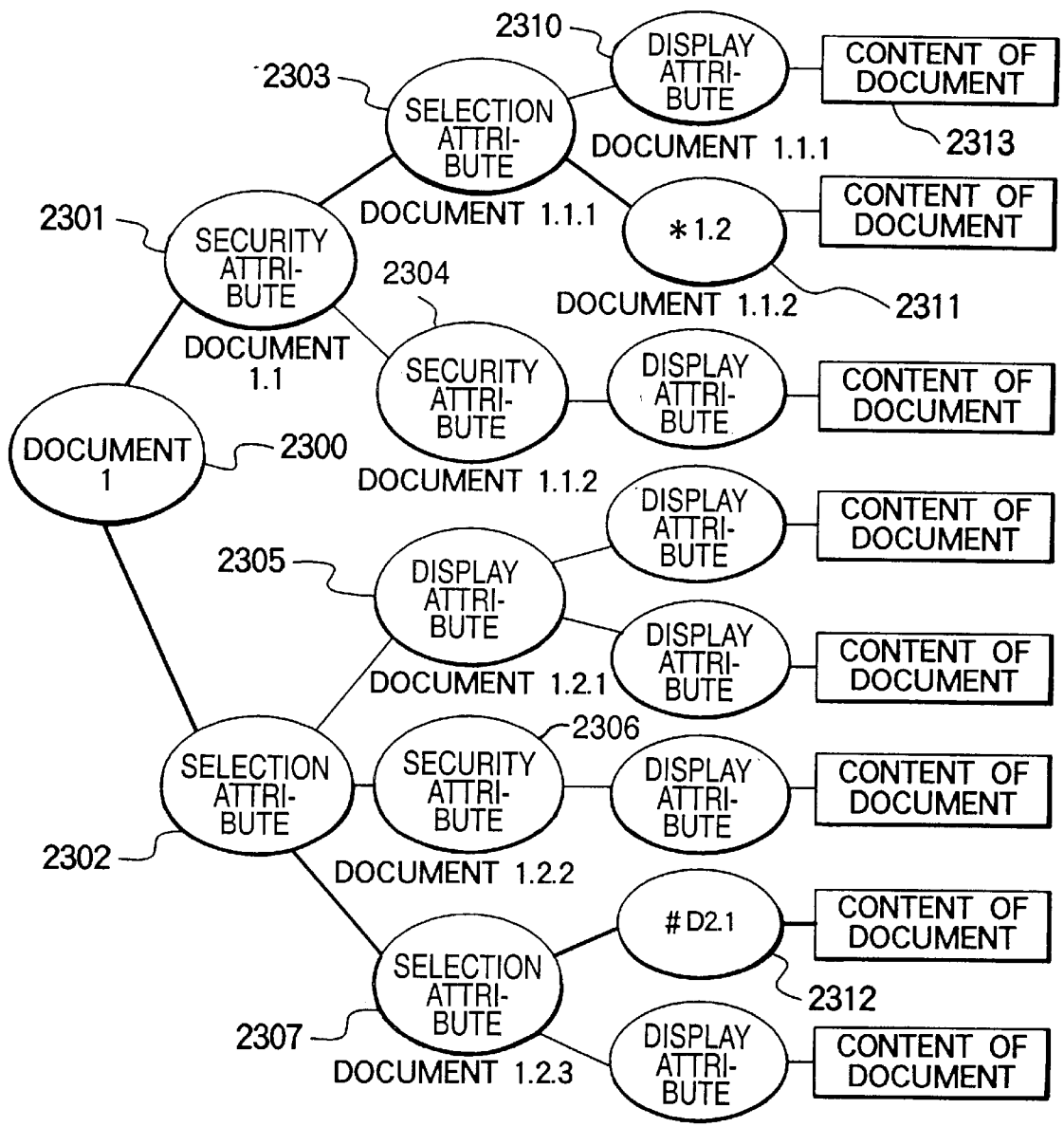
FIG. 23 is a diagram showing the structure of hyper-document information.

FIG. 23 shows an example of the constitution of hyper-document information in accordance with the present invention. The document information is stored in the external storage 232 of the document processor 202 of FIG. 2.

In this configuration, a reference numeral 2300 denotes a first constitution or constituent unit having an identifier name "document 1". In this embodiment, the constituent units of a hyper-document are represented in a hierarchic structure, basically, in a tree structure. In this example, the unit 2300 is associated with two constituent units 2301 and 2302. The unit 2301 is related to two constituent units 2303 and 2304, whereas the unit 2302 is associated with three units 2305 to 2307. In this connection, "document 1.1" "document 1.2.3", etc. are identifier names of the respective constituent units. A constituent unit disposed at an end of the tree structure, for example, one in a rectangle 2313 includes information of document contents. In contrast thereto, a unit arranged at an intermediate point in an ellipse does not include the document contents information. Namely, there is included document attribute data for each partial constitution unit. The data is used, for example, to control an order of document reference operations and to supervise security of document data.

Description will now be given of types and functions of attribute data items included in the constituent units. The security attribute of each of the units 2301 and 2306 is a type of attribute data of the associated constitution unit and is kept therein when security is required to be given for information of a partial tree beginning from the unit. As for the security attribute, there can be considered, for example, a condition for possibility/impossibility of reference or a method of judgment to decide the condition. The security attribute of each of the units 2302, 2303 and 2307 is a type of attribute data of the related constitution unit and specifies a condition and a method to climb down the pertinent partial tree beginning from the unit. The security attribute of each of the units 2305 and 2310 is a type of attribute data of the corresponding constitution unit and specifies a condition and a method to present information of the contents of the partial tree beginning from the unit. A specific example thereof will be described later. Constitution units 2311 and 2312 specify link attributes to allow a free movement or displacement of control in an order other than that determined by the tree structure. This attribute is also a kind of attribute data of the constitution unit.

Link attribute information *1.2 denoted by a numeral 2311 indicates that control can be moved to the document 1.2 which is a constitution unit in the document. Link attribute information #D2.1 denoted by a numeral 2312 designates that control can be moved to the constitution unit 2.1 in another document. In this situation, whether control is actually moved according to link information or along the inherent tree structure may be determined through an interactive operation with the user or in consideration of other conditions such as the contents of related data. This is also the case with the code attributes described above. Specific examples will be described later.

When processing the hyper-document information items, a program to achieve predetermined processing is read from an external storage 232 provided in document processor 202 to be loaded into a main storage 231 to await an event that the user specifies a hyper-document name to be referenced. In response to a specification of a hyper-document name from a keyboard 211 of writer terminal 201 by the user, the document processor 202 reads the hyper-document from the external storage 232. According to interactive operations with the user, decision of related data, and information described in the document, a processing object is moved between constitution units of the document, which will be described later.

When control arrives at a portion including the contents of the document, the hyper-document is outputted to a display 212, a printer 213, or a voice sounding device 217 of writer terminal 201 through network 204 according to a method specified to display the contents, thereby presenting the document to the user. Only one portion of the document is thus displayed. Also after the presentation is finished, according to an indication from the user or the related information items, control proceeds to the next constituent portion of the document.

In this system as above, there are provided hyper-document information and a method of processing the information in which a reference order and a method of displaying the contents of a document can be altered according to statistically or dynamically designated conditions in association with the contents of the document and information related thereto, which will be described later in detail.

Subsequently, description will be given of an example of related data which is, in addition to the attribute data, information essential to the document reference operation.

FIGS. 24A and 24B show examples of personal characteristic information and personal attribute state information, respectively. The related data is stored in the external storage 232 of the document processor 202 of FIG. 2.

FIG. 24A shows an example of personal characteristic information 2410 including personal attributes of the user, whereas FIG. 24B shows an example of personal attribute state information related to utilization experiences of the system or the hyper-document. FIG. 24A includes a date of birth of the user 2411, a sex identification field 2412, an address field 2413, an occupation field 2414, a hobby field 2415, and a group to which the user belongs 2416. In the columns on the right of these items, there are stored attribute values related to the pertinent user. For example, the birth date of the user is May 3, 1982.

Next, in FIG. 24B, a numeral 2421 denotes information about utilization experiences of the system, a numeral 2422 designates a list of hyper-documents of the system already referenced by the user, and a numeral 2423 stands for information of progress or history related to reference to hyper-documents. In FIG. 24B, these attribute values are shown in the left-side columns, whereas supplementary or additional explanations of the attributes of the user, not the attribute values of the user, are shown in the right-side columns. In this connection, the group 2416 indicates that the user belongs to a group called "group A" and "group J".

FIGS. 25A and 25B respectively show examples of group characteristic information and group attribute state information, which are classified into a kind of related data. The group information is stored in the external storage 232 shown in FIG. 2.

FIG. 25A shows an example of group characteristic information 2510 including attributes of a group, whereas FIG. 25B shows an example of group attribute state information 2520 containing therein utilization experiences related to the system or hyper-documents. In FIG. 25A, there are included a date of birth of a member of the group 2511, a sex identification field 2512, an address field 2513, a class field 2514, a characteristic of class 2515, and a group name 2516. On the right-side columns of the attribute names, there are stored examples of the respective attribute values. In FIG. 25B, a numeral 2521 stands for a utilization experience of a member of the group with respect to the system, a numeral 2522 designates a list of hyper-documents of the system already referenced by the member of the group, and a numeral 2523 indicates an average reference state of the hyper-document by the member of the group. In FIG. 25B, the attribute names are shown in the left-side columns, whereas there are shown additional explanations of the attributes, not the attribute values, in the left-side columns. In FIGS. 24A and 24B, the characteristics of the user are respectively supplemented with characteristic data items as shown in FIGS. 25A and 25B of the group to which the user belongs.

FIG. 26 is a diagram for explaining related data showing much more general states as compared with characteristics of a person and a group. The related data is stored in the external storage 232 of the document processing unit 230 of FIG. 2.

In FIG. 26, a numeral 2650 indicates the overall body of information, a numeral 2651 denotes the current date (year, month, and day), numerals 2652 and 2653 respectively designate a nation and a place where the system is installed, a numeral 2654 stands for the version of the system, a numeral 2655 designates a utilization state such as the utilization count and frequency of the system, and a numeral 2656 denotes information related to a user of the system, a group of users of the system, or a user most frequently using the system. In the left-side columns, there are shown names of the information items, whereas in the right-side columns, there are described examples or explanations about the contents of the respective information items.

The information items associated with the respective users, groups, and general states are kept in the system such that the document reference operations are controlled according to the information items and document information items. A specific example of the system utilization will be now described.

By reference to the flowchart of FIG. 27, description will be given of a method of controlling an operation to present a hyper-document to the user according to the document and related information.

Figure 27:
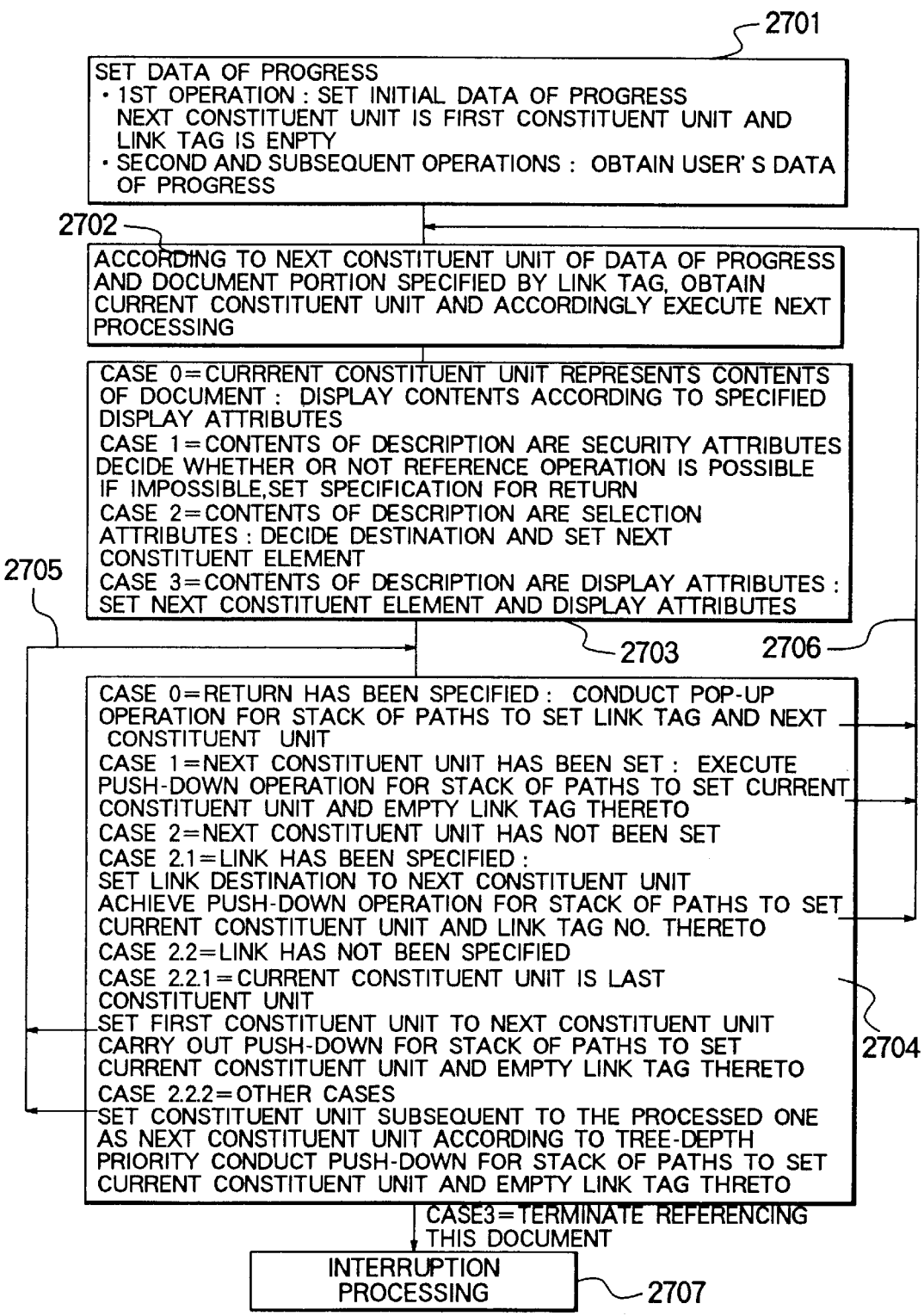
FIG. 27 is a flowchart showing a flow of hyper-document processing in an embodiment according to the present invention.

FIG. 27 shows a flowchart of operation of the program operating under the document processor 202 of FIG. 2 to control hyper-document information of the hyper-document system in the document processor 202 of FIG. 2, thereby implementing the operating method and the presenting method.

In FIG. 27, a numeral 2701 indicates processing of initialization executed according to hyper-documents specified to be used by the user. In the processing 2701, the data of progress means data to keep therein a state of a hyper-document being referenced by a user. The data is generated when the user starts utilizing the hyper-document and is changed in the course of progress of the reference operation so as to be continuously kept and utilized. Namely, when the user interrupts the operation of the system of the hyper-document, the data of progress at the point of time is saved in the external storage 242. When the user accesses the hyper-document again, the document system acquires the saved data therefrom. Under this assumption, the processing 2701 achieves the system initialization to use the hyper-documents specified by the user. That is, if the user has already utilized the hyper-document (namely, in the second and subsequent operations of the hyper-document), data of progress saved in the storage 242 is moved therefrom into an area of progress data in the main storage 231. In another case, namely, in the first operation, data of progress is generated to be stored therein. Description is given only of the initial values of the next constituent unit and the link tag, which are particularly important in the system. The next constituent unit indicates a constituent unit to be next referenced. In this example, the first constituent unit is specified. The link tag indicates whether or not the constituent unit is a constituent unit of the document. When this field is empty, it is denoted that the unit is the constituent unit thereof. In the second and subsequent document operations, these items are set according to the contents of the saved data of progress.

The contents of the saved progress data will be described in detail by reference to FIG. 28.

FIG. 28 shows an example of the contents of data of progress saved in the external storage 242 at an interruption of a document reference operation. In the embodiment of the document system using a network of FIG. 2, the data of progress is saved and stored in the external storage 232 of the document processor 230.

In FIG. 28, a numeral 2800 indicates a utilization progress of a user with respect to a hyper-document having a document name "document 112" and a title "Genji Monogatari (Japanese; A Story of Genji)". A numeral 2801 denotes the name of the hyper-document and a numeral 2802 indicates a link tag and the current constituent unit. The link tag denotes whether or not the constitution unit is a portion of the hyper-document. As shown in this diagram, when this field is empty, it is indicated that the unit is a portion of the hyper-document.

In this example, the current constitution unit 3.2.2 denotes an identifier name of a constitution unit currently being referenced. A numeral 2903 designates a path of progress in which constitution units referenced by the user up to the current constitution unit are recorded in a time-series string. A numeral 2804 designates a title of a record of the contents of responses made to inquiries issued from the system in the operation to reference the hyper-document. Since an inquiry is sent with a specified constituent unit, the response is recorded together with the constituent unit. Moreover, the same constituent unit may possibly be used several times. In this example, consequently, there are prepared a field for the last response and a field for another preceding response.

A numeral 2805 indicates a field subdivision for the respective fields. Numerals 2805 to 2807 designate examples of records of the responses in three constitution units, respectively. A numeral 2806 indicates that the previous response of the user is "Y" in the constitution unit 1 and that the user has issued a response "N" before. A numeral 2808 designates that the previous response of the user is "4" in the constitution unit 3.2 and that the user has issued a response "1" or "3" before.

As information in the area of progress data of the main storage 224, the saved data of progress 2800 is acquired and is kept for use; moreover, the information includes the data of the next constitution unit. When initially setting the data of the next constitution unit in the second and subsequent document operations, the link tag and the current constitution unit are obtained from the saved data of progress 2802 to be accordingly set in the system. As a result, the processing can be restarted from a point of the document portion being referenced at the interruption.

Returning to the explanation of the flowchart shown in FIG. 27, the function of the processing 2701 includes an operation to initially set the data of progress described above in the progress data area or an operation to set the saved data of progress 2800 in the progress data area. Next, in a processing step 2702, according to the next constituent unit and the link tag of the progress data in the progress data area, there is obtained a constituent unit of a document specified by these items, thereby setting the unit as the current constituent unit. The operation to set the current constituent unit according to the next constituent unit and the link tag is achieved as follows. When the link tag field is empty, a pointer to the next constituent unit is attained according to a pointer kept in the document information or the document attribute data of the constituent unit already loaded in the main storage so as to set the attained pointer as a pointer to reference the current constituent unit. If the link tag field is not empty, the next constituent unit is missing in the pertinent document. Consequently, according to a document identifier name indicated by information of the next constituent unit of the progress data and a constituent unit name thereof, an objective constituent unit of an objective document is acquired from the hyper-document kept in the external storage 225 so as to be loaded in the main storage 224. A pointer associated therewith is set as a pointer to reference the current constituent unit. These items are used when the contents of the document information are referenced in the processing sequences 2703 or 2704.

In the processing sequence 2703, there is executed the primary processing of the present invention in which the contents of the current constitution unit are referenced to provide an operation method according to the specifications thereof. In this example, there appear four cases according to the contents of the referenced document as follows.

Namely, in case 0, the contents of the current constituent unit are those of a document. This is, for example, the constituent unit 2313 in terms of the hyper-document information described in conjunction with FIG. 23. In FIG. 23, the discrimination is denoted by the contour of the constituent unit, namely, by an ellipse and a rectangle.

In the case 0, the contents of the current constituent unit are those of a document and are displayed according to the display attributes beforehand specified, which will be described later. According to the display attributes, the contents are presented with character strings or by voice. When character strings are to be displayed, the contents are outputted to a display 212 or to a printer 213. When the printer 213 is used, there is specified a character size of the font for the print operation. When the contents are outputted by voice through a voice output device 217, the loudness of the voice and the frequency thereof are to be specified. In the processing of the case 0, the display attributes and the contents of the document including the constituent unit are supplied to the display, printer, and/or voice output functions, thereby presenting the contents of the specified document. The presentation is to be terminated when a preset period of time is elapsed or when the user inputs an indication for termination. Technologies related to the user's indication and processing thereof have been commonly known and hence are not shown in FIG. 27. Such technologies will be described whenever necessary in the present specification.

Next, case 1 of the processing 2703 will be described. In the case 1, the attribute data contains a security attribute. In a portion where a security attribute is specified, a check is made to determine whether or not the user of the pertinent document constituent unit is allowed to reference, at this point of time, a constituent unit at a lower level with respect to the pertinent document constituent unit. If the reference operation is possible, the processing is terminated; otherwise, a state of return specification is set for the next processing 2704.

A specific example of utilization of security attribute information will be described by reference to FIGS. 29A and 29B. The information is stored in the external storage 232 of the document processor 202 of FIG. 1.

FIG. 29A shows an example of personal information described above in which the reference level of the user 2901 indicates L2. This level is a level of the user to reference the document. In this example of FIG. 29B, there is shown a case of security attribute information kept for each document constituent unit. A numeral 2900 indicates the overall body of security attribute information, a numeral 2902 denotes two explanation fields including a reference level field and a field denoting "accessibility (possibility or impossibility) of reference".

Numerals 2903 to 2905 designate examples of the contents of security attribute information. For example, the entry 2903 indicates that the document constituent unit can be referenced when the user's reference level is L0. The entry 2904 means that the constituent unit can be referenced when the user's reference level is L1 and the date field of the general state data shown in FIG. 26 contains a date value which is equal to or more than that of a value representing Mar. 1, 1992. The entry 2905 stipulates that the unit cannot be referenced in any other case. In this case, when the user possesses the personal characteristic information of FIG. 29A, it is impossible to reference the document constituent unit. This is because the user's reference level is L2.

Naturally, independently of this situation, this constituent unit can be referenced by other users having other reference levels. Moreover, the pertinent user who cannot reference the unit may reference other constituent units of the document. Thanks to this operation according to the present invention, there can be developed an efficient application in which, for example, security of the document can be controlled according to a small-sized unit, i.e., for each document constituent unit. There may also be implemented a method in which a security check is specified such that a characteristic of a group to which the user belongs is checked for security of document data.

For example, a document thus specified as above can be accessed only when a user belongs to a group having the class characteristic 2515 set as "college preparatory class for science and technology" in the group characteristic information 2510. In this connection, in the operation to decide whether or not the document can be referenced, there may be employed an attribute description such that an inquiry to the user and a response thereto are utilized for the decision, which will be described later. With this provision, there may be achieved a security control operation. For example, the document can be referenced only when the user inputs an authorized password in response to an inquiry.

Returning to the flowchart of FIG. 27, description will be given of case 2 of the processing 2703. This applies to a case where the attribute data of the constituent unit indicates a selection attribute. A selection attribute is information to decide the next constituent unit to be referenced. Depending on situations, the next reference unit is automatically determined by a program checking related data. However, the unit may also be decided through an interactive operation with the user.

The selection attribute information includes a specification stipulating such a decision method. For example, in a case where the program checks the related data to automatically determine the next constituent unit to be referenced, assume the selection attribute 2303 of FIG. 23 to be the pertinent constituent unit. Assume further that the document 1 is a book about letters (how to write letters), a way of writing a leading portion of a letter is described in the constituent units including the document 1.1.1 and subsequent documents, and the writing techniques are described for male and female readers in the units 2310 and 2311, respectively. In the selection attribute 2303, if the next constituent unit 2301 or 2311 is desired to be decided according to the sex of the user, it is only necessary to check the sex identification field 2412 of the personal characteristic information 2410 of the user so as to automatically determine the next constituent unit. In this case, the attributes are described as follows.

Condition (personal characteristic-information.sex column) male:document 1.1.1.1, female:document 1.1.1.2. This indicates to check the sex column of personal characteristic information such that if the value thereof indicates "male", pass control to the document 1.1.1.1; whereas, if the value indicates "female", pass control to the document 1.1.1.2.

The automatic destination decision may also be effected according to personal state information of related data. For example, the document history 2422 of the personal state information 2420 of FIG. 24B is checked such that when the related document has already been referenced, the duplicated portion of the description is skipped. Moreover, there may be considered, as an example of use of the general state information, the above case of writing letters. Namely, as a selection attribute to specify a constitution unit of the season's greetings, there may be adopted a description specifying the date field 2651 of the general state information 2650 so as to automatically select a partial constituent unit containing the season's greetings for the respective seasons.

Figure 30:
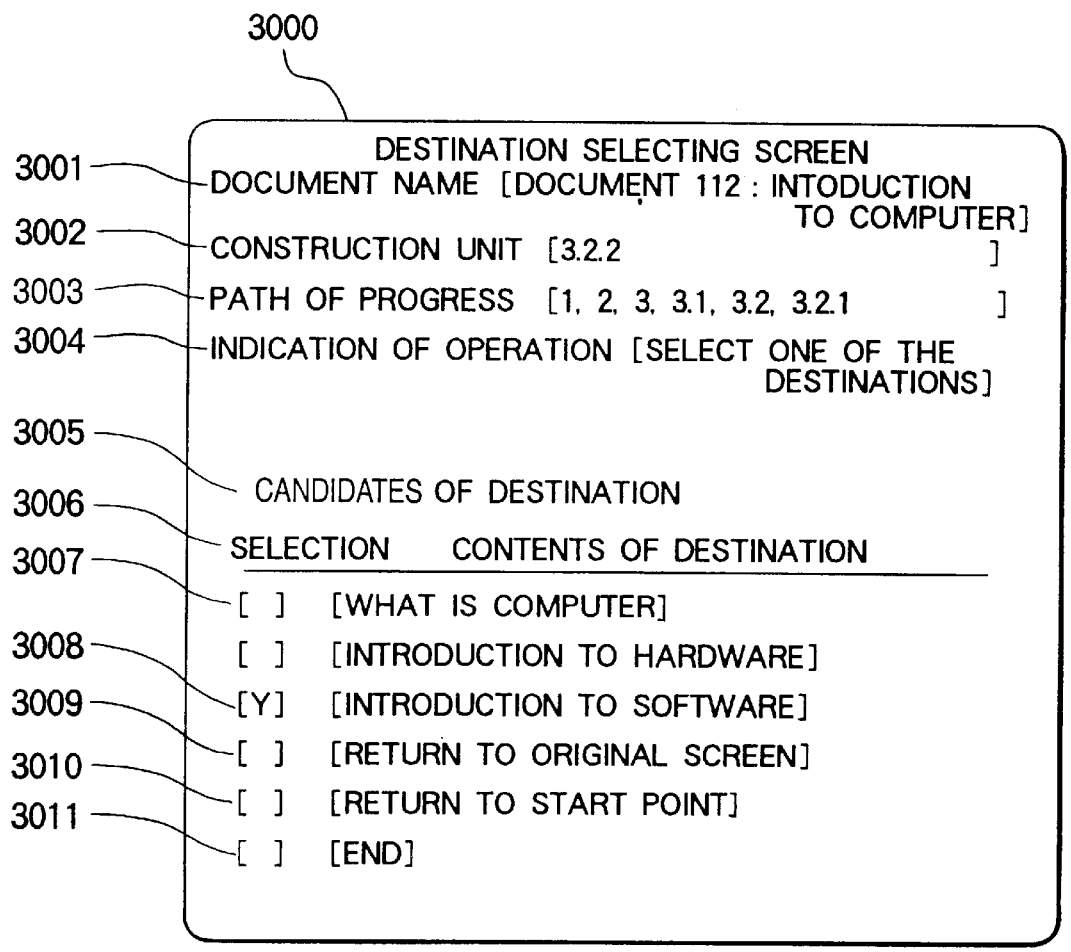
FIG. 30 is a diagram showing an example of the interactive screen to specify selection items.

FIG. 30 shows a screen of the display 212 presenting an inquiry issued to the user and a response from the user. The screen corresponds to that of the display 212 of the reader terminal 200 in the embodiment of the document system using the network of FIG. 2.

In this constitution, a numeral 3000 denotes the overall structure of the destination selecting screen. A numeral 3001 designates a document name, a numeral 3002 stands for a current constituent unit, a numeral 3003 indicates a list in time series of constituent units referenced up to this point of time, a numeral 3004 designates a message to instruct the user to select a destination, a numeral 3005 stands for an output character string "Ikisaki no koho (Japanese; candidates of destination)", a numeral 3006 indicates a title for the following destination selection items, and numerals 3007 to 3011 designate destination selection items.

Assume that when the user inputs "Y" in a field of the title "(Sentaku Japanese; select)", the destination described in the right-side field is selected. In this example, the user selects as the destination a constituent unit "Introduction to Software". The destination may be selected irrespectively of the current reference portion. There may also be specified the item 3010 indicating to return control to the start point of the document or the item 3011 denoting to terminate referencing the document. In the operation of the case 2 of the processing 2703, the destination thus selected by the user is set as the next constituent unit. When the user specifies termination of the document reference operation, there is set state information keeping therein the condition.

Next, description will be given of case 3 of the processing 2703. This is a case where the contents of the document denote display attributes. A display attribute is a description item related to a method of presenting information of the contents of a document at a lower-level. Also in the processing, there may be specified for a case where the program automatically decides the display attribute according to the related data or a case where the attribute is determined according to an inquiry to the user and a response from the user. In either case, as a result of the processing, the display attribute value is set. In the case 0, the attribute value to present the contents of the document is determined in accordance with the display attribute specified for the higher-level constituent unit and the display attribute values set according thereto.

Figure 31:
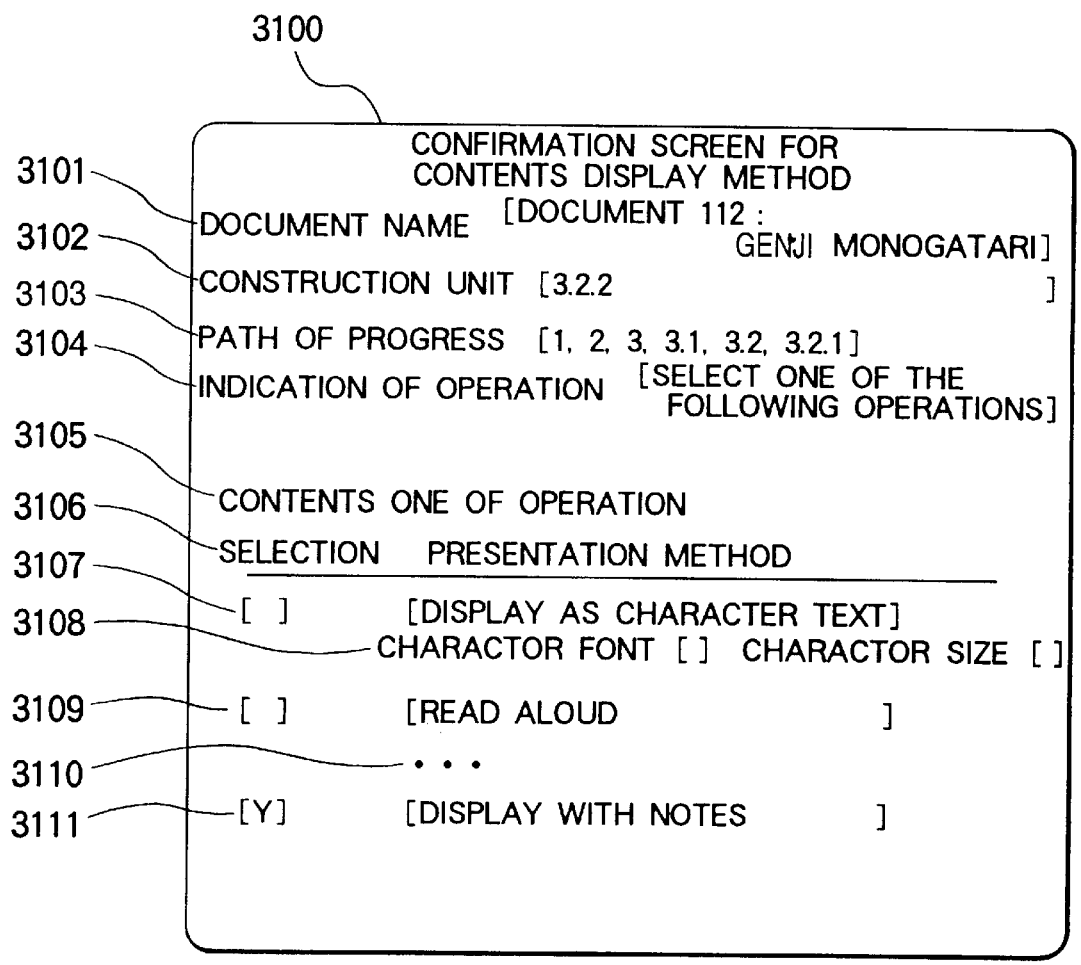
FIG. 31 is a diagram showing an example of the interactive screen to set display attribute values.

Referring now to FIG. 31, description will be given of an example of the screen to issue an inquiry to the user to decide a display attribute. The screen corresponds to that of the display 212 of the reader terminal 200 in the document system using the network shown in FIG. 2.

In FIG. 31, a numeral 3100 indicates a screen to confirm the contents display method. This image is displayed on the screen of the display 212 for the inquiries from the system and responses thereto from the user. In this configuration, a numeral 3101 indicates a document name, a numeral 3102 denotes a current constituent unit, a numeral 3103 stands for a path of progress designating constituent units referenced up to this point, a numeral 3104 designates a message of indication to the user, a numeral 3105 indicates an output character string "Sosa naiyo (Japanese; Contents of operation)", a numeral 3106 stands for a title of the following presentation method selection items, and each of numerals 3107 to 3111 indicates a presentation method selection item.

When the user inputs "Y" in a field corresponding to a title "Sentaku (Japanese; select)", the presentation method described in the right-side field is selected. In this example, after the selection is finished, in order to specify a detailed presentation procedure, there are disposed detailed indications to display text characters. Namely, a character font and a character size can be designated as indicated by a numeral 3108.

In this case, there is shown an example in which the user selects a way of presentation to display the document with notes. Assume that to a reader of the present age reading "A Story of Genji" which is a classic of Japanese literature, the document of the story is presented with notes including interpretation of meanings of terms appearing therein. Results of the indication are set to the internal state information to be used in the case 0 of the above processing. In this connection, as an example of automatically deciding the display attribute, there may be considered an operation in which, when a personal characteristic information includes an item indicating that the reader has weak sight, the program automatically selects a method to present the document in a loud voice. This description of indication may also be conducted according to the above method of specifying items with conditions.

Incidentally, in the example of the processing 2703, there have been described only simple cases and processes thereof. Actually, however, in an identical constituent unit, it is necessary to sequentially execute a plurality of processes or to selectively execute several processes thereof depending on cases. In such a case, it is only necessary to process a conditional sequence of fundamental functions and hence description thereof will be avoided in this specification.

Next, a processing sequence 2704 will be described. This processing sequence is executed primarily to pass control to the next constituent unit. The processing sequence 2704 is fundamentally subdivided into four cases. First, processing of case 3 will be described. This is because the case 3 is first checked in the processing flow. This case is effected to terminate referencing the document. As described in conjunction with the case 2 of the processing 2703, when the user specifies termination of the document reference operation, there is set state information keeping therein the pertinent condition. In the case 3 of the processing 2704, the information of termination indication has been set. In this regard, although the information setting operation may be conducted as described above, it is also possible to set the information according to a specification designated by the user via the interactive screen. Alternatively, the information may be set in association with a user's operation for an interruption while the contents of the document are being displayed. In each of these cases, the terminal indication information is first checked in the processing 2704. If the information has been set, control is passed to an interruption processing sequence 2707 as the processing of the case 3. The cases other than the case 3 include three cases, namely, cases 0 to 2, which will be described in the following paragraphs.

First, the case 0 will be described. In this case, the return specification has been set in the processing 2703. As described for the case 1 of the processing 2703, when it is determined according to the specification of the security attribute that the user is not allowed to reference the document, the return specification state is set for the next processing 2704. In the case 0 of the processing 2704, the return processing is denoted in advance. This specification indicates that control is to be returned to a constituent unit immediately before the current constituent unit in the document reference sequence. In the description of the example of the processing 2703, the setting operation is carried out only of the security control. However, like the termination indication, the return specification may be generally effected according to a request from the user at an arbitrary point. When processing the return specification, from the stack of paths in which constituent units referenced up to this point are sequentially recorded, an entry at the highest level is obtained to be set to the link tag and the next constituent unit, thereby transferring control via a path 2706 to the processing 2702. As already described, according to the link tag and the next constituent unit, the next constituent unit is acquired and is referenced in the processing 2702.

Figure 32A:
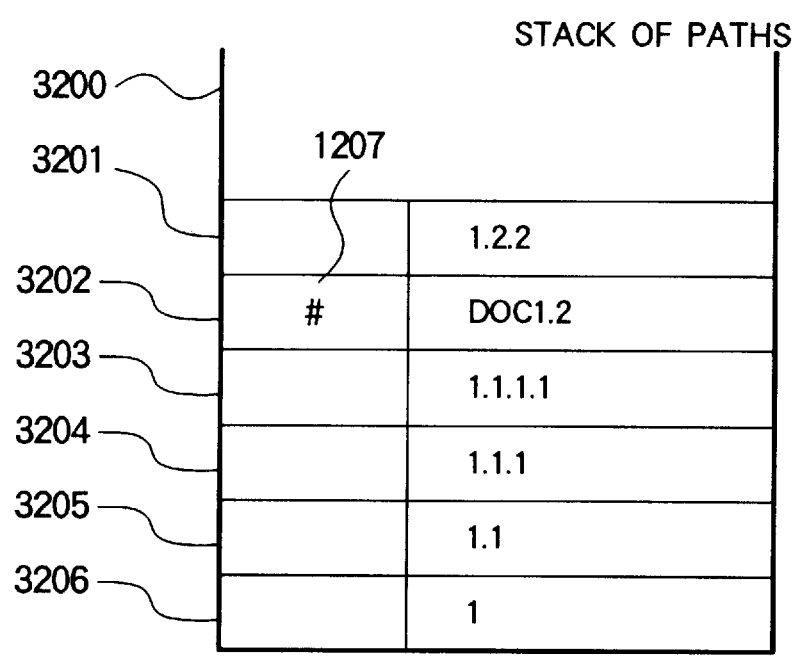
FIGS. 32A and 32B are diagrams for explaining an example of a path or route stack.
Figure 32B:
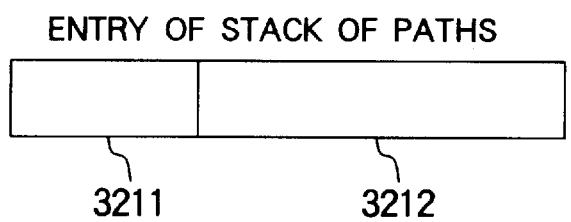

Referring now to FIGS. 32A and 32B, description will be given of examples of the path stack and the contents thereof. FIG. 32A shows an example of the contents of the stack of paths, whereas FIG. 32B shows an example of the layout of the entry in the stack. The entry is the unit of data stored in the stack.

The stack is arranged in the main storage 231 of the document processor 202 of FIG. 2.

In FIG. 32A, a numeral 3200 indicates the overall configuration of the stack, a numeral 3201 indicates a highest-level entry, and numerals 3202 to 3206 are entries stored therein before the entry 3201. The stack is configured in the same manner as for the general stacks commonly known. Namely, entries are accumulated in a sequential manner so as to acquire later the highest-level entry therefrom. In the stack of paths, as can be appreciated according to the name thereof, each path of the document reference operations is stored therein in the form of a sequence of constituent units. Each entry of the stack represents an identification of the pertinent document constituent unit.

In FIG. 32B, a numeral 3211 indicates a first field of the entry containing a link tag. A numeral 3212 designates a second field of the entry containing an identifier of the constituent unit. The link tag has already been described in conjunction with FIG. 23. For a link to another document, "#" is stored in the link tag field 3211. In this case, a document name and an identifier of the constituent unit are stored as the unit identifier in the second field 3212. In any other case, an identifier of the constituent unit in the document need only be set as the identifier of the constituent unit in the second field 3212.

In FIG. 32A, the numeral 3202 indicates an example of the link to another document. In this situation, as the identifier of the constituent unit of the second field, there are described a document name "Doc" and an identifier of the constituent unit in the document "1.2". For other entries, the link tag fields are empty and hence it is indicated that the constituent units are those of the document.

Returning to the flowchart of FIG. 27, the case 0 of the processing 2704 will be described. As above, the highest-level entry of the stack keeps therein the identifier of the document constituent unit referenced immediately before. For the return specification, it is only necessary to attain the entry from the stack so as to set the entry as the next constituent unit, thereby passing control to the processing 2702. In the description of the processing 2704, a pop-up operation indicates that the highest-level entry is read from the stack so as to be deleted therefrom.

Next, the case 1 of the processing 2704 will be described. This applies to a case where the next constituent unit has been set in the processing 2703. In the description of the case 2 of the processing 2703, the next constituent unit is set through the processing of the selection attribute. The next constituent unit to be specified in the processing 2703 is limited to a constituent unit of the pertinent document. In this situation, as the identifier of the constituent unit, the empty link tag and the next constituent unit already set are stored in a field of the highest-level entry of the stack (push-down). Thereafter, control is passed to the processing 2702.

Next, the case 2 of the processing 2704 will be described. This applies to a case where none of the termination indication information, the return specification, and the next constituent unit is set in advance. This case is subdivided into a case 2.1 where a link specification is present and a case 2.2 where the link specification is missing. The link specification is assumed to be present if the link attribute information items 2311 and 2312 described in conjunction with FIG. 23 are beforehand specified for the pertinent document constituent unit.

In the case 2.1 with the link specification, a link destination specified as the link attribute information is set to the link tag and the next constituent unit. Subsequently, there is generated path stack entry information including an identifier of the current constituent unit having a document identifier as the first item and a link tag "#", thereby achieving a push-down operation thereof in the stack of paths. The constituent unit is a portion of the pertinent document. However, since the link destination is another document, a return operation therefrom is a transfer of control between documents. Consequently, the condition is indicated in the stack. Thereafter, control is passed via the path 2706 to the processing 2702.

Next, description will be given of the case 2.2 where the link specification is missing. This case is further subdivided into subordinate cases as follows. In a case where the current constituent unit is the final constituent unit (case 2.2.1), it is assumed to transfer control to the start point of the document and hence the next constituent unit is accordingly set, thereby passing control via the path 2705 to the processing 2702. In a case where the current constituent unit is other than the final constituent unit (case 2.2.2), it is assumed to transfer control to the next constituent unit in the tree structure of the document. In this case, according to the depth-first priority, the next constituent unit is decided to be set as the next constituent unit, thereby passing control via the path 2705 to the processing 2702. In either case, the current constituent unit and the empty link tag are subjected to a push-down operation in the path stack.

Description has been completely given of the processing 2704. Next, an interruption processing step of the processing 2707 will be described. When the user desires to terminate an operation of the document system or to start referencing another document, this processing is achieved to interrupt the current document reference operation as already described in the description of the flowchart. In the interruption processing, it is important to save data of progress as described in conjunction with the processing 2701 of FIG. 27. An example of the contents of the progress data has already been shown in FIG. 28. The data is stored together with the document identifier in the external storage 26. The contents of the data to be saved are generated according to the contents of the progress data area and information of the stack of paths at the point of time. The contents of the information are used to create the progress path 2803 in the data of progress shown in FIG. 28. After the interruption processing is finished, an action is made to finish the use of the document system or to proceed to an operation to reference another document. However, such an operation is omitted from the flowchart.

Description has been given of embodiments of cases other than a case where the common data is controlled in a centralized manner for each of a plurality of document constituent units and a case where document information is controlled according to the progress of reference operations and/or the progress of responses from the user up to the pertinent point of time.

Figure 33:
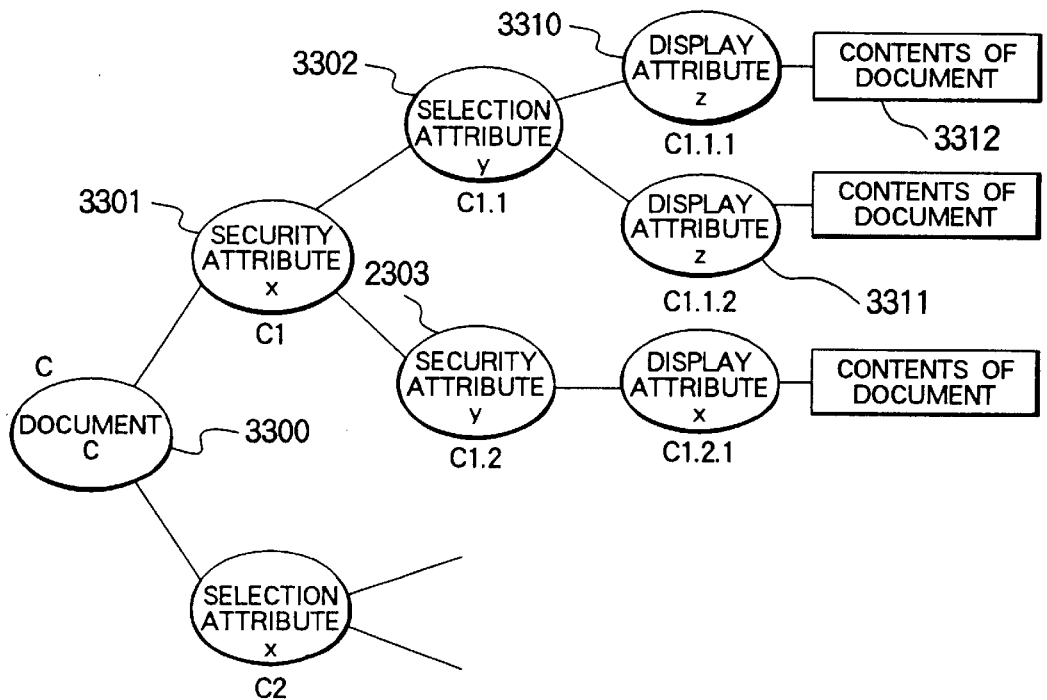
FIG. 33 is a diagram showing the structure of a hyper-document having common attribute data for each constituent unit of a plurality of documents.
Figure 34:
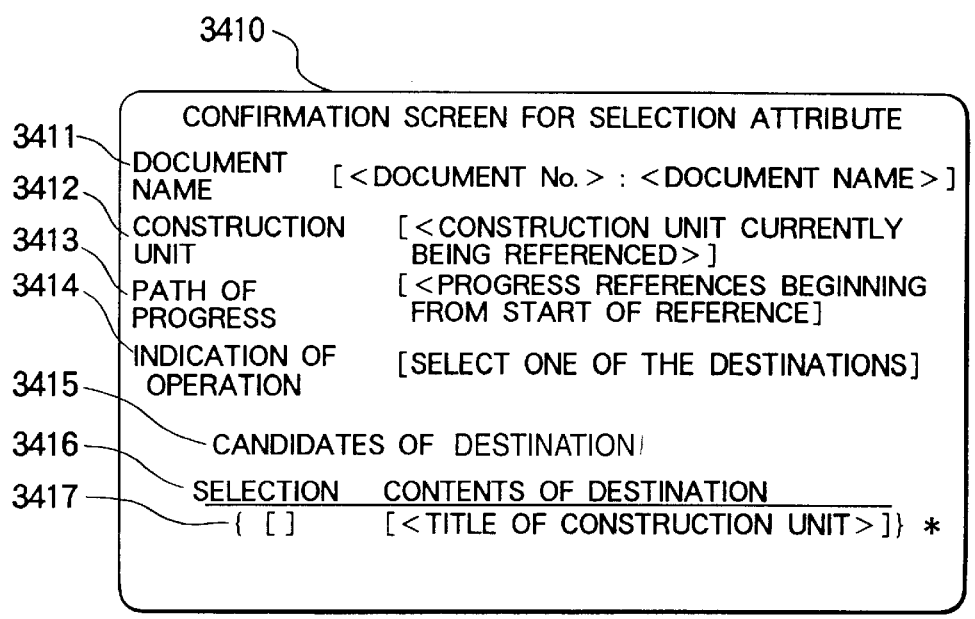
FIG. 34 is a diagram showing an example of the selection attribute confirmation screen of a reader terminal.

Referring now to FIGS. 33 and 34, description will be given of an embodiment according to the present invention. In this embodiment, thanks to utilization of the common attribute data for each of the plural document constituent units, the amount of specifications for attributes of the respective documents are minimized and documents are controlled in a centralized fashion for each kind thereof, thereby deciding a method of referencing the document.

FIG. 33 shows an example of document information related to a class of hyper-documents having a common constitution and common attributes shared among a plurality of documents. The information is kept in the external storage in a form to present items thereof in association with class names. Document information associated with the pertinent class is stored in the associated storage 242 of the document data file device 203 in the embodiment of the document system using a network shown in FIG. 2. The information is in the format such that items thereof can be read in association with class names thereof. In the case of FIG. 33, "document C" is specified as a class name. In this diagram, a numeral 3300 indicates a first constituent unit of the document class information and each of the numerals beginning from 3301 denotes a constituent unit. Of these units, the unit Ca (3301) keeps therein a security attribute x, whereas the unit 3312 keeps therein the contents of the document. When using a document class, the user specifies a document class name of the document in the first constituent unit of each hyper-document information shown in FIG. 23. In this case, the configuration of the hyper-document is assumed to be equal to that of the specified document class. Moreover, for a constituent unit for which attribute data is missing in the pertinent hyper-document, it is assumed that there is specified attribute data of the constituent unit of the associated document class. However, for example, in a case where a selection attribute is described in the hyper-document and the selection attribute is also described in the constituent unit of the associated document class, the selection attribute described in the hyper-document is assumed to be valid.

Moreover, for example, in a case where the selection attribute is described in the hyper-document and the security attribute is missing therein, if the security attribute is specified in the constituent unit of the associated document class, it is assumed that the security attribute is specified for the hyper-document. As above, the attribute description of each constituent unit of the class is interpreted, unless a description of the same kind of information is specified for each constituent unit of the hyper-document, as if the attribute description is specified for each constituent unit of the hyper-document. Namely, if the description of the same kind of information is specified for an individual constituent unit of the hyper-document, the system preferentially processes the description. With this provision, in a case where a plurality of hyper-documents have a common configuration and common attributes, common information items associated therewith are collectively handled in a centralized manner to reduce the amount of data to be processed. Moreover, it is possible to specify attribute data inherent to each document. In addition, this enhances security of the documents having the common characteristics.

For example, when it is desired to change common attributes of the documents belonging to the same class, the change operation need be conducted only at a storage location of the common attribute. In the flowchart of FIG. 27, the processing of the document class is not shown; such an operation can be achieved as follows. In the operation to reference the attributes of the constituent unit, there are referenced, in addition to the attributes of the hyper-document, the attributes of the constituent unit associated with the specified document class. According to information of these attributes, there is obtained information of the attributes including an attribute related to the priority to be applied to the pertinent unit, thereby executing the processing as described by reference to the flowchart of FIG. 27.

Information common to a plurality of hyper-documents need not be strictly shared among documents. Namely, if the information is common thereto at a level of constituent units, it is significant to keep the information as above. The information is referenced from each constituent unit of the individual hyper-document.

FIG. 34 is a screen to confirm selection attributes showing an example of description of selection attributes of a constituent unit class. The confirmation screen is presented on the display 3012 of the reader terminal 3000 of FIG. 30.

The description of items also applies to selection attributes for each constituent unit of a document class and for each constituent unit class. As already described in conjunction with the selection attributes of hyper-document information by reference to FIG. 30, FIG. 34 shows an example of description of selection attributes of a constituent unit class. The description of FIG. 34 is in a much more generalized form as compared with that of FIG. 30.

In FIG. 34, a numeral 3410 indicates description of selection attributes of a constituent unit class, a numeral 3411 denotes "Bunsho mei (Japanese; document name)" to display the pertinent document number and the document name between the brackets, a numeral 3412 designates "Kozo tani (Japanese; constituent unit)" to display an identification of the current constituent unit between the brackets, a numeral 3413 stands for "keika pasu (Japanese; progress path)" to display a progress path from the reference start point to this point between the brackets, a numeral designates "Sosa shiji (Japanese; indication of operation)" to display a message between the brackets, a numeral 3415 specifies to describe candidates of the destination, a numeral 3416 indicates to display selection items and the contents of the destination, and a numeral 3417 denotes to first display the brackets and to present thereafter a title of a constituent unit having a level immediately following that of the pertinent constituent unit. Only one title is to be displayed in the area between the brackets. The last indication "*" designates that the contents of the previous specification are repeatedly effected as many times as there are lower-level constituent units immediately following the pertinent constituent unit.

The term "document name" in these paragraphs designates a name of a hyper-document referencing the pertinent constituent class. The name varies depending on cases and cannot be directly described in the class definition. Consequently, there is utilized the generalized description thereof as above. The description of the last line is also a typical example of the general form. This is also the case with the other description lines. Processing of the information items is not shown in the flowchart of FIG. 27. However, such an operation can be conducted, for example, as follows. Information of the constituent unit class is acquired in the processing 2703 such that the information is applied to the general description and is then interpreted for execution thereof.

Next, description will be given of an embodiment of hyper-document information and the operation thereof according to the present information in which there are stored, according to specifications of the user, portions of documents and the contents of documents reflecting a progress of reference operations and a progress of responses of the user up to the current point of time, thereby making it possible to reference the stored information items. The specification is conducted together with a new document name ordinarily at an interruption of a document reference operation. In response to the specification, there is obtained a progress path of the user in the reference operation to the pertinent document to obtain only a portion of the document associated with the path. The document portion is assigned with the new document name specified by the user and is then stored in the external storage 215. Thereafter, when the user specifies the document name to request initiation of a reference operation with respect to the document, the system achieves a data retrieval through the external storage 215 to obtain the data thereof. In this connection, it is also possible to store responses from the user at intermediate points of a document reference operation. With this provision, in an operation to access the document, the data of the document and the data items thus stored at intermediate points are acquired from the storage for subsequent processing. Namely, the responses to the previous inquiries are used for the reference operation, thereby eliminating the necessity for inquiries for the data items in the second and subsequent operations. These processing steps may also be added to the processing 2703 of FIG. 27 if necessary.

Figure 35:
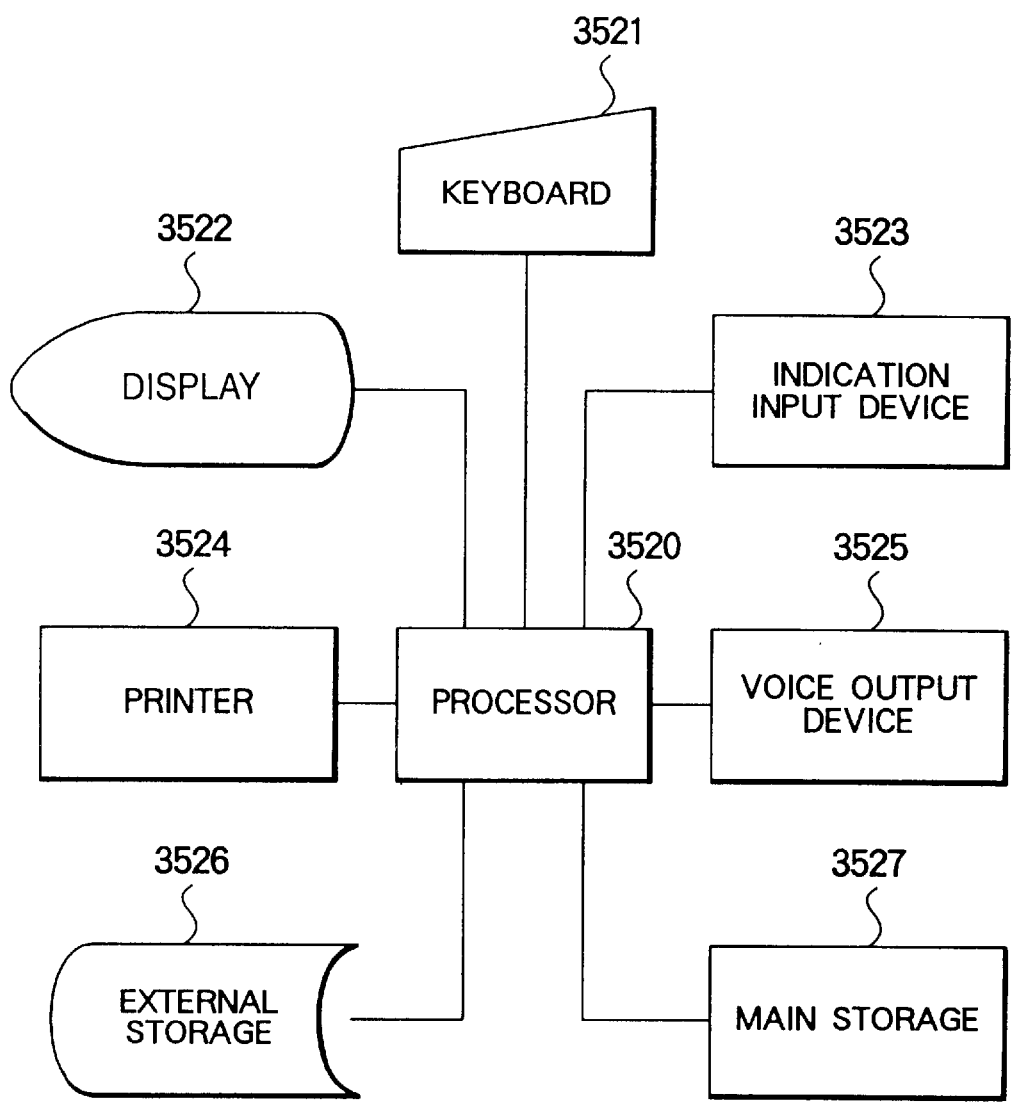
FIG. 35 is a diagram showing the constitution of a system having a terminal used as the reader and writer terminals.

FIG. 35 shows a variation of the document processing system of FIG. 2.

The configuration of FIG. 35 does not employ the network used in FIG. 2 and is an example of a document system operating in an independent manner. The reader terminal 200, the document processor 202, and the document data file device 203 of FIG. 2 collectively correspond to the constitution of FIG. 35.

In the structure of FIG. 35, a processor 3520 is a processing unit for executing programs implementing the document system, a keyboard 3521 enables the user of the system to specify a document name so as to input a response to an inquiry from the system, a display 3522 is an output device for displaying thereon hyper-documents, inquiries from the system to the user, and responses thereto from the user, an indication input device 3523 is an input facility for the user to indicate a portion of the items presented on the display 3522 so as to send a response to the system, a printer 3524 is a document output device for printing the contents of hyper-documents on sheets of paper when required, a voice output device 3525 is a document output device for outputting a voice representation of the contents of hyper-documents when required, an external storage 3526 is means for saving therein hyper-document information and for storing therein programs and such information necessary for the system as related data and data of progress, and a main storage 3527 is a storing device for reading therein programs and document data of the system from the external storage 3526 when necessary, such that the data is reference by programs and data is created or modified by programs.

Namely, in the constitution of FIG. 35, the reader terminal 200 and the writer terminal 201 of FIG. 2 are replaced with a single unit and the necessary peripheral devices are selected from the structure of FIG. 2.

Figure 36:
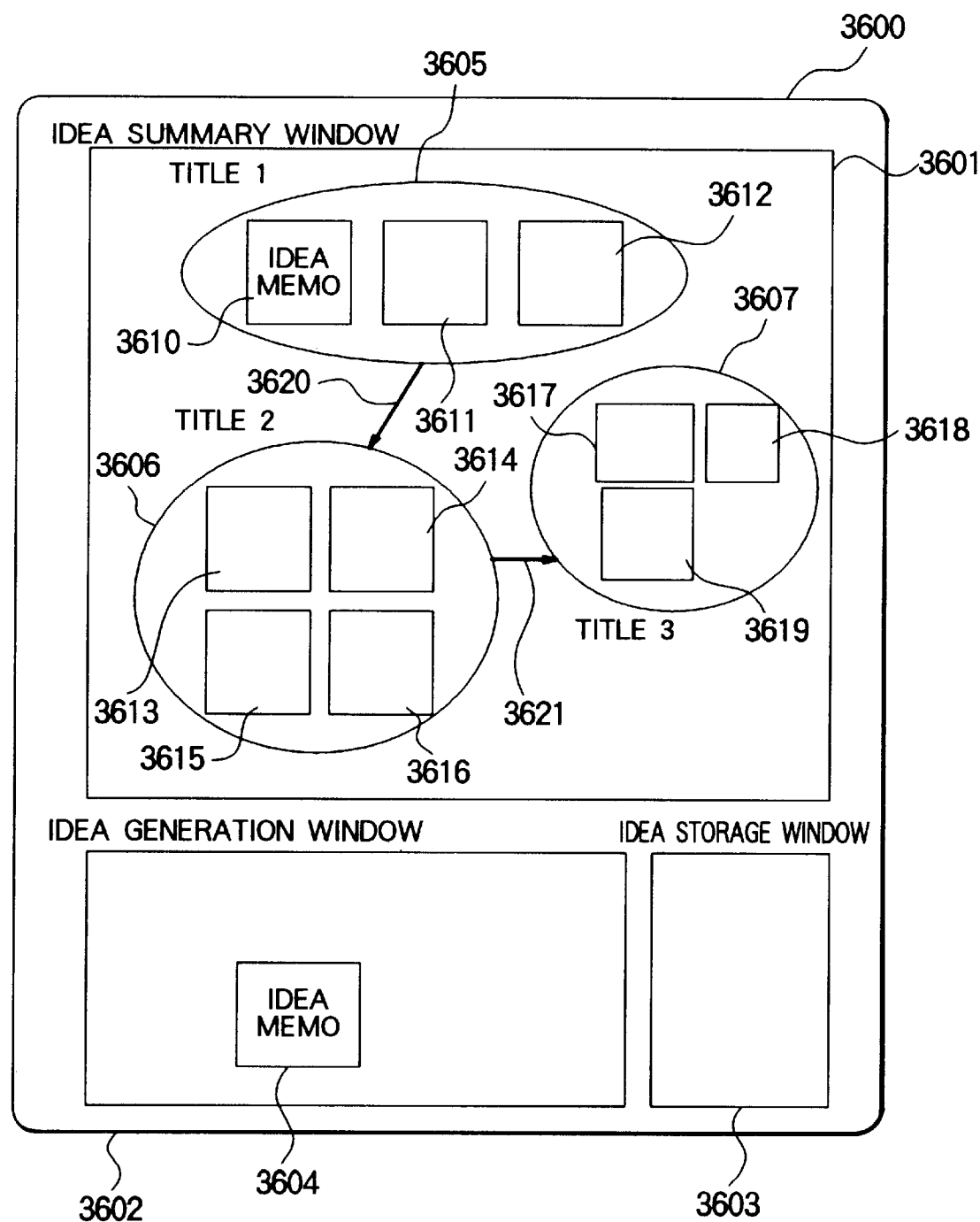
FIG. 36 is a diagram showing an example of the terminal screen presenting ideas in the format of documents.

FIG. 36 shows an example of a display screen for expressing ideas in the form of a document. In order for the reader or writer to arrange and classify ideas as materials of a document, there is disposed an idea summary window 3601 in the terminal screen 3600.

Moreover, there is arranged an idea generation window 3604 to created ideas in the form of an electronic memo. In addition, the configuration includes an idea storage window 3603 in which registration and retrieval operations are conducted for accumulated ideas. In the idea creation window 3604, an idea memo may be inputted from the keyboard. Alternatively, character strings written as a memo on a sheet of paper may be read through a character recognition device to convert the strings into encoded data in the format of the electronic memo, thereby inputting the data in the idea generation window 3604. Moreover, a sheet of paper of a memo may be inputted as image data in the window 3604. Via the idea storage window 3603, it is possible to access an information file storing therein these memos as materials of documents.

In the idea summary window 3601, ideas produced in the window 3602 and idea memos retrieved through the window 3603 are displayed on the screen as indicated by numerals 3610 to 3619. These idea memos can be interactively classified into groups to generate sets of ideas 3605 to 3607. Furthermore, relationships between the sets of ideas may be interactively assigned as denoted by numerals 3620 and 3621. The materials of documents can be arranged via the screen in this fashion. This consequently leads to an advantage in that many received idea documents are re-arranged on the screen so that the reader rapidly and systematically understands the contents thereof.

Figure 37:
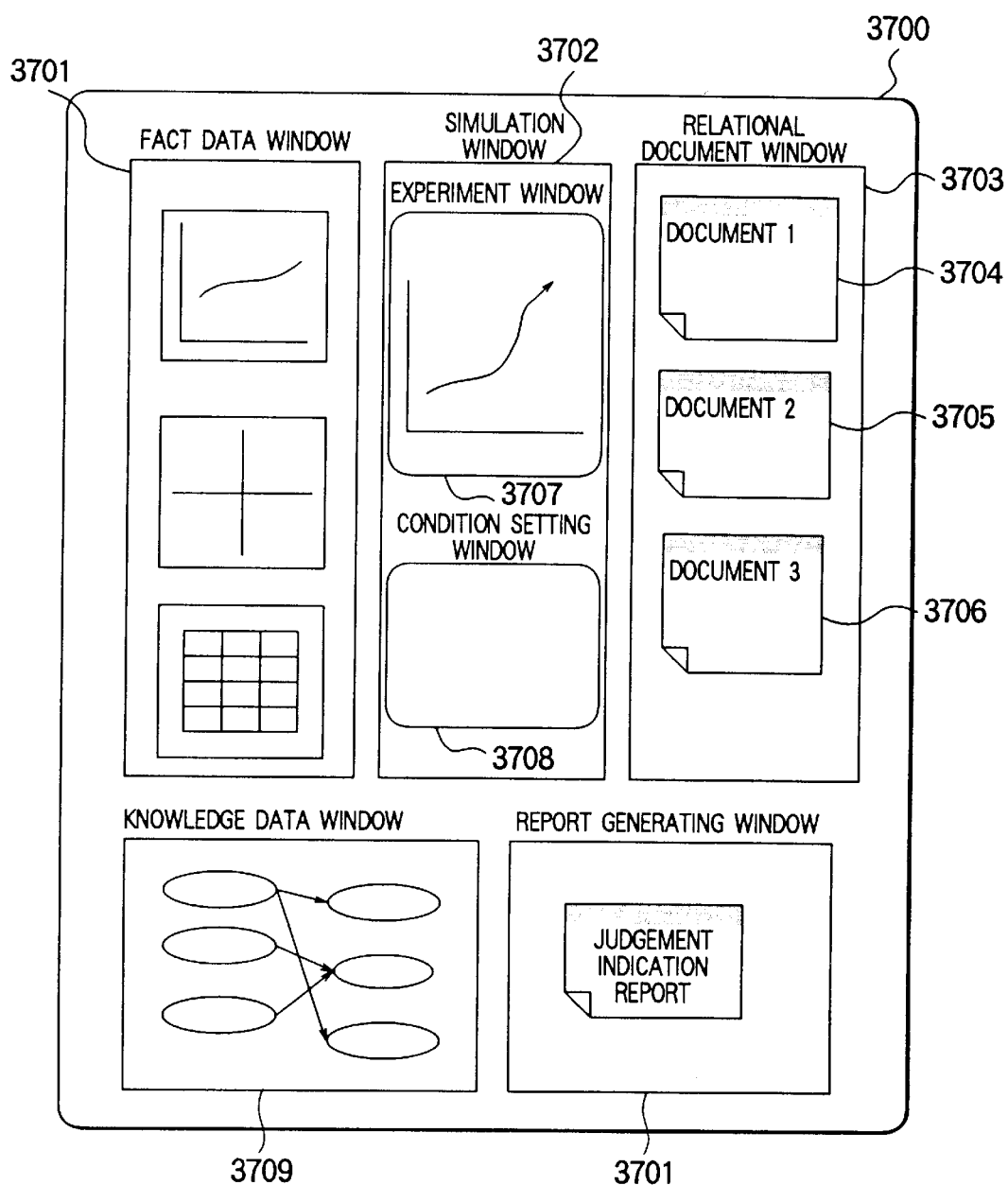
FIG. 37 is a diagram showing an example of the display screen to conduct strategic judgment.

FIG. 37 is a diagram for explaining a screen operation to make a strategic decision in the document system. In the terminal screen of the document system, there are disposed such windows as a fact data window 3701, a simulation window 3702, a relational document window 3703, a knowledge data window 3709, and a report generation 3710. Documents and data items are manipulated in these windows to generate indications of decisions in the form of a document. In the window 3703, there are presented received documents 3704 to 3706. Various statistical data items related to the documents are displayed in the window 3701. In the knowledge data window 3709, there are displayed basic items of knowledge necessary for decisions. The simulation window 3702 includes an experiment window 3707 and a condition setting window 3708 so that conditions are interactively specified in the window 3708 to conduct an experiment under the conditions so as to present results of the experiment in the window 3707. After the operations are achieved in these windows to make a decision, a document including an indication of the decision is produced in the report creation window 3710, thereby distributing the document via the network.

Figure 38:
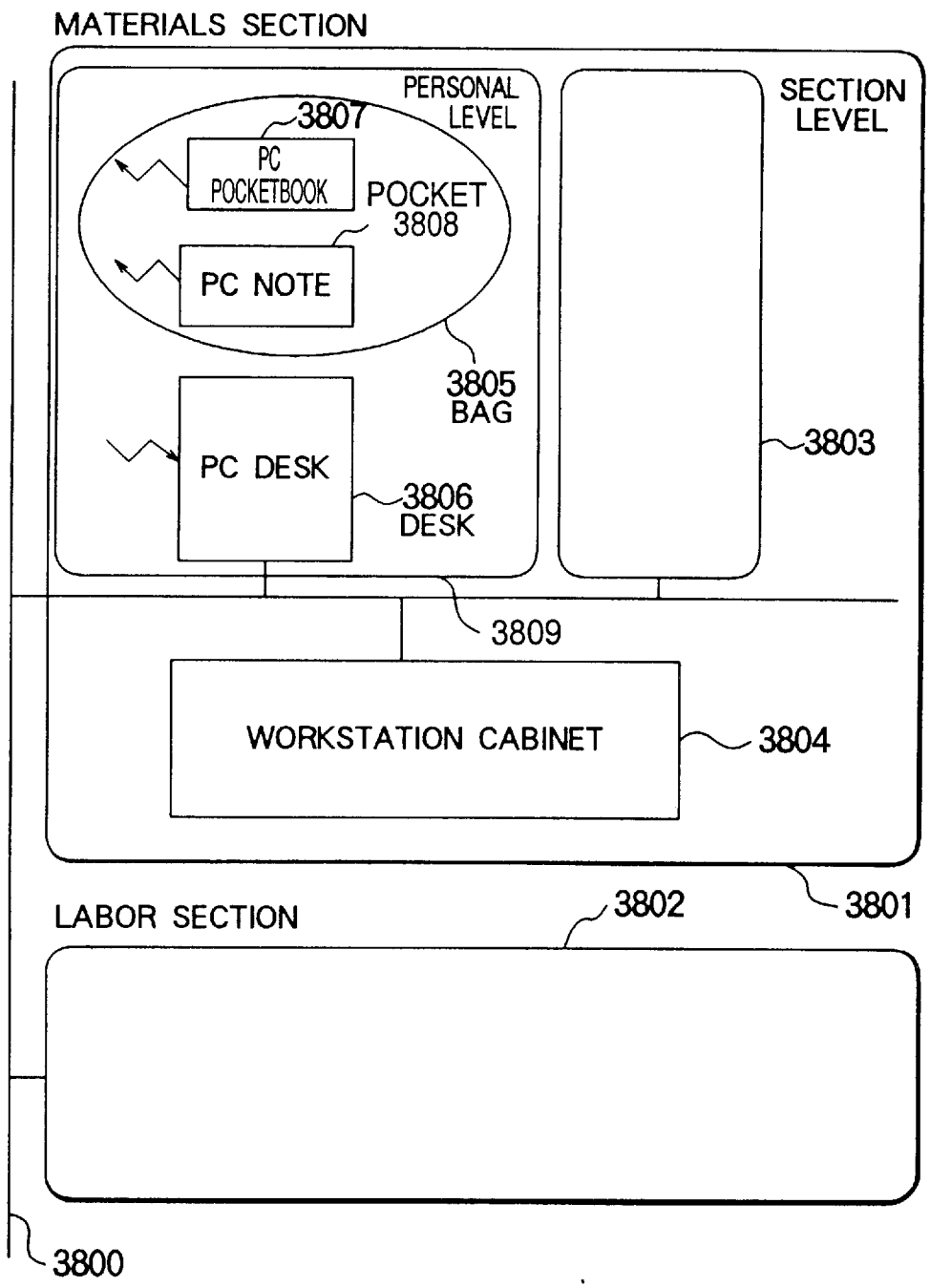
FIG. 38 is a diagram showing an example of the hierarchic structure of a document system.

FIG. 38 shows the hierarchic configuration of the document system. In this structure, a plurality of section-level sub-systems, for example a materials section document sub-system 3801 and a labor section document sub-system 3802, are connected to a network 3800. To the section-level sub-system, there is connected a server-type workstation as indicated by a reference numeral 3804 to achieve the document processing and to carry out the document storage, control, and retrieval operations. In addition, a personal-level document system 3809 includes three computers of mutually different kinds, which are located on a business desk, in a briefcase for documents, and in a user's pocket as denoted by 3803. At the desk level, a personal computer designated as 3806 is disposed at a personal level to communicate with a notebook-type personal computer to be placed in a personal briefcase 3805 and a pocketbook-type personal computer 3807 to be placed in a pocket, 3808.

Figure 39:
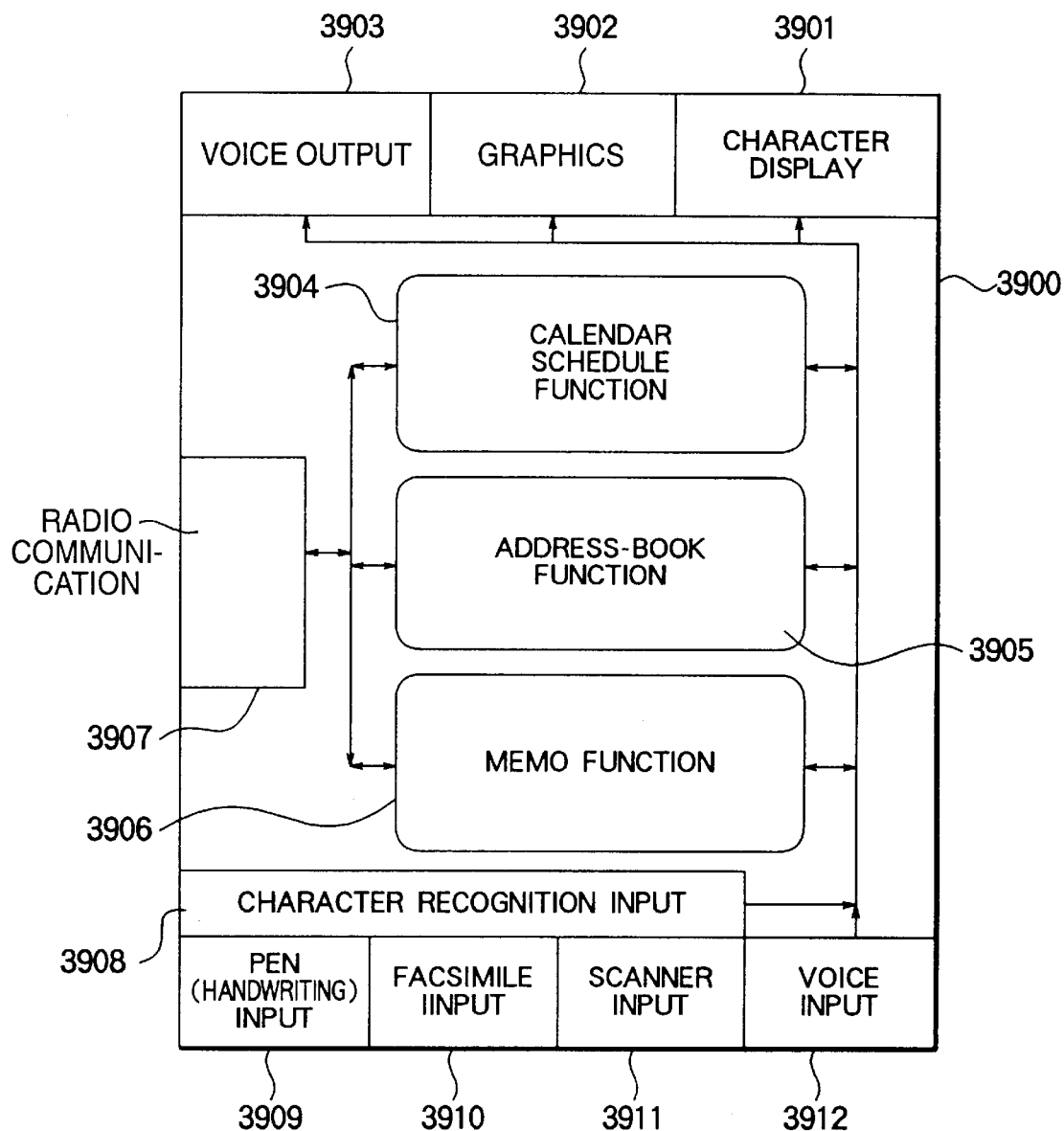
FIG. 39 is a block diagram showing an example of the constitution of a notebook-type document processing apparatus.

FIG. 39 shows the construction of a notebook-type personal computer used in the document system. To receive inputs from the actual world, the computer 3900 includes such input means as a handwriting (pen) input section 3909, a facsimile input section 3910, a scanner input section 3911, a voice input section 3912, and a character recognition section 3908 to recognize characters and letters. Through these input sections, documents are converted into the form of image data, vector data, and/or voice data to be supplied to the computer 3900. Moreover, there is disposed a radio communication section 3907 to achieve communications with terminals of other document systems. To achieve data output operations, there are included a voice output section 3903, a graphics display section 3902, and a character display section 3901 so as to display documents on a screen and/or to output documents in a synthesized voice. The computer 3900 includes a memo section 3906, an address recording section 3905, and a calendar schedule section 3904 so as to achieve document processing and date scheduling operations for simple documents such as a memo. In the computer 3900, a document printed on sheets of paper and document image data can be encoded by the character recognizing function. this leads to an advantageous effect that image data thus encoded can be efficiently utilized as materials of a document. Moreover, the operation necessitated to re-input a document from the keyboard can be eliminated. Consequently, documents can be commonly used and hence there can be constructed a data base having a high utilization efficiency.

According to the embodiments, above, a document can be adaptively re-constructed for a reader to display and to output portions of the document desired by the reader. Furthermore, elements of the document can be presented in an order requested by the reader. In addition, since the document can be re-configured according to an intention and a state level of the reader, it is possible for the user to read and to understand the document in a short period of time. For example, when the reader is a high-rank person, it is possible to output the document in a summarized form. When the reader is a foreigner, the document can be translated into a language of the foreigner to output the translated document. Moreover, for children, the contents of the document can be converted into animation images to present the images to the children. This helps the children easily understand the contents of the document.

The amount of the output document can be controlled according to a request of the reader; namely, the reader receives the document having the desired length. In addition, the document can be outputted according to specifications of a device used by the reader, thereby solving the problem that the document cannot be appropriately read due to limited functions of the device. Thanks to provision of the character recognizing function, there can be processed various forms of documents such as a document printed on sheets of paper, a document represented in the form of image data, and a document prepared in an encoded form. This makes it possible to commonly use documents and hence there can be configured a reusable data base.

Furthermore, according to the embodiments, when utilizing a document, there can be selected flexible usages thereof according to the respective constituent portions of the document. Namely, documents can be referenced in various manners; for example, decision of the next reference position and presentation of the contents thereof can be flexibly selected.

In addition, the document referencing method can be determined according to the user of the document, characteristics of a group to which the user belongs, and/or a state related to more generalized conditions.

Furthermore, the document reference method need not be necessarily determined according to the data stored in advance. Namely, according to specifications by the user at the point of reference operation, there can be decided a document referencing method as above.

Moreover, thanks to definitions of attribute data shared among a plurality of document constituent units and the mechanism to reference the data, the amount of specifications of the respective documents is decreased and those documents having an identical document kind can be controlled in a centralized manner. Furthermore, the document reference method can be determined as above.

In addition, with the provision of the hierarchic structure of documents, there can be implemented a document reference order according to relationships of links having a high degree of freedom, and control can be easily returned to the link origin.

Moreover, after the user interrupts a document referencing operation, it is possible to restart the operation according to the interrupted state.

Furthermore, portions of documents and the contents of documents reflecting a progress of user's reference operations and a progress of user's responses can be stored so that the stored data is referenced thereafter in the processing.

In addition, according to the document attribute data, user's characteristic data, and general state data, it is possible to control whether or not portions of a document are presented to the user.

While particular embodiments of the invention have been shown and described, it will be obvious to those skilled in the art that various changes and modifications may be made without departing from the present invention in its broader aspects.

I claim:

1. A document information processing apparatus in which document information is generated, referenced, and re-constructed according to the intentions of a writer of the original document information, said intentions including at least one of validity, future characteristic, interest, relationship, analogy, rarity value, synonymy, and concept level, and in which the original document information is referenced and re-constructed according to the intentions of a reader of the original document information, comprising:

a reader terminal including means for inputting the intentions of the reader of the original document information, and means for outputting, for display, document information referenced and re-constructed according to the intentions of the reader, wherein the reader terminal includes first means for inputting an attribute state of the reader, said attribute state including at least one of the following items: official title, age, language used, and output device; and second means for determining a configuration of a document to be referenced or to be re-constructed according to the attribute state of the reader by identifying each item constituting said attribute state;

a writer terminal for inputting the intentions of the writer of the original document information and thereby generating document information; and a document processing unit connected to the reader terminal and to the writer terminal, including means for storing document information representing an original document created by the writer, said document information being generated by the writer terminal, means for storing an attribute table uniquely identified with a reader, the attribute table being consulted by said second means to determine the document configuration to be referenced or re-constructed according to the attribute state of the reader, and processing means for automatically processing, in response to a document information request from the reader terminal and according to the configuration of the document determined by the reader terminal, the stored document information representing the original document information created by the writer, thereby converting the original document according to the document configuration matching the attribute state of the reader.

2. An apparatus according to claim 1, wherein the reader terminal includes means for inputting an amount of a document text desired by the reader, and the document processing unit summarization processes an original document text to be referenced or to be reconstructed, thereby summarizing the document text in the amount of document text input by the reader; and wherein the reader terminal includes means for inputting a range of abstract of the original document information desired by the reader, and the document processing unit includes means for storing the range of abstract of the original document information and selects elements included in the document according to the range, thereby outputting only the selected elements.

3. An apparatus according to claim 1, wherein:

the writer terminal includes means for inputting the original document information in the form of image data; and the document processing unit includes means for automatically classifying partial areas of the image data into images, text, and drawings in response to an input of said image data, and means for recognizing a character pattern of the partial areas and translating the character pattern into character codes, thereby re-constructing the partial areas of the original document according to the inputted document image in accordance with the intentions or an attribute state of the reader.

4. An apparatus according to claim 1, wherein:

the reader terminal includes means for setting a document information reading sequence for assigning a sequence of constituent elements in the original document information desired by the reader; and the document processing unit includes means for storing the reading sequence set from the reader terminal, thereby changing, according to the reading sequence, an array of constituent elements of original document information to be referenced or to be re-constructed.

5. An apparatus according to claim 1, wherein:

said attribute state includes at least one of age and language used; and the document processing unit includes means for setting a representation format of document information from a plurality of representation forms prepared beforehand according to the attribute state of the reader inputted from the reader terminal, and converting, according to the representation format thus set, objective document information to be referenced or to be re-constructed, thereby outputting the converted document information.

6. An apparatus according to claim 1, wherein:

the document processing unit includes means for storing a reader's intentions for reference or re-construction inputted from the reader terminal beforehand, said intentions including at least one of validity, future characteristic, interest, and analogy, and means for assisting, according to the reader's intentions, creation of a document on the side of the writer by inputting the intentions of the reader, interpreting the intentions of the reader, and regenerating the document while creating document information at the writer terminal.

7. An apparatus according to claim 1, wherein:

the writer terminal includes means for inputting validity and a future characteristic for a document to be created;

the reader terminal includes means for inputting an intention or a state for a document to be created; and the document processing unit includes means for storing the validity and future characteristic supplied respectively from the writer terminal and the reader terminal, and means for assisting creation of a document by the writer terminal according to the intentions or the states with reference to the intentions inputted from the writer terminal so as to meet all the intentions while creating the document.

8. An apparatus according to claim 7, wherein the validity and future characteristic are predeterminedly stored as attributes in said attribute table, and wherein said means for assisting creation of a document automatically assists creation of a document by retrieving said validity and future characteristic from said table.

9. An apparatus according to claim 1, wherein the attribute state is the official title, which is predeterminedly stored as an attribute in said attribute table, and wherein the document processing unit automatically converts the original document information by retrieving the official title from said attribute table.

* * * * *